United States Patent
Tanabe

(10) Patent No.: US 9,331,517 B2
(45) Date of Patent: May 3, 2016

(54) ELECTRONIC DEVICE, METHOD, AND STORAGE MEDIUM

(75) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1107 days.

(21) Appl. No.: 13/303,429

(22) Filed: Nov. 23, 2011

(65) Prior Publication Data

US 2012/0133335 A1  May 31, 2012

(30) Foreign Application Priority Data

Nov. 29, 2010  (JP) ................................ 2010-265095

(51) Int. Cl.
*H02J 7/00* (2006.01)
*H02J 1/10* (2006.01)
*H02J 9/00* (2006.01)
*H02J 7/02* (2016.01)

(52) U.S. Cl.
CPC ...................................... *H02J 7/025* (2013.01)

(58) Field of Classification Search
USPC ................. 320/107–115, 103; 307/23, 66, 67
See application file for complete search history.

(56) References Cited

U.S. PATENT DOCUMENTS

| | | | |
|---|---|---|---|
| 8,044,639 B2 * | 10/2011 | Tamegai | H02J 7/0055 307/43 |
| 2009/0271048 A1 | 10/2009 | Wakamatsu | |
| 2010/0194206 A1 | 8/2010 | Burdo | |
| 2010/0277120 A1 | 11/2010 | Cook | |
| 2011/0018494 A1 * | 1/2011 | Mita | H02J 7/025 320/108 |
| 2011/0140671 A1 * | 6/2011 | Kim | H02J 7/025 320/137 |
| 2011/0156636 A1 | 6/2011 | Kim | |

FOREIGN PATENT DOCUMENTS

| | | |
|---|---|---|
| CN | 1829037 A | 9/2006 |
| CN | 101136561 A | 3/2008 |
| CN | 101261549 A | 9/2008 |
| CN | 101667753 A | 3/2010 |
| CN | 201654673 U | 11/2010 |
| GB | 2485898 A | 5/2012 |
| JP | 10-021968 A | 1/1998 |
| JP | 2003-079075 A | 3/2003 |
| WO | 2010/068062 A2 | 6/2010 |

* cited by examiner

*Primary Examiner* — Richard Isla Rodas
*Assistant Examiner* — Michael DiBenedetto
(74) *Attorney, Agent, or Firm* — Canon USA, Inc. IP Division

(57) ABSTRACT

An electronic device includes a first unit that wirelessly receives power from a power supply apparatus, and a control unit that executes control, if an external apparatus, including a second unit that wirelessly receives power from the power supply apparatus, and the electronic device are connected, to select at least one of the first unit and the second unit.

19 Claims, 7 Drawing Sheets

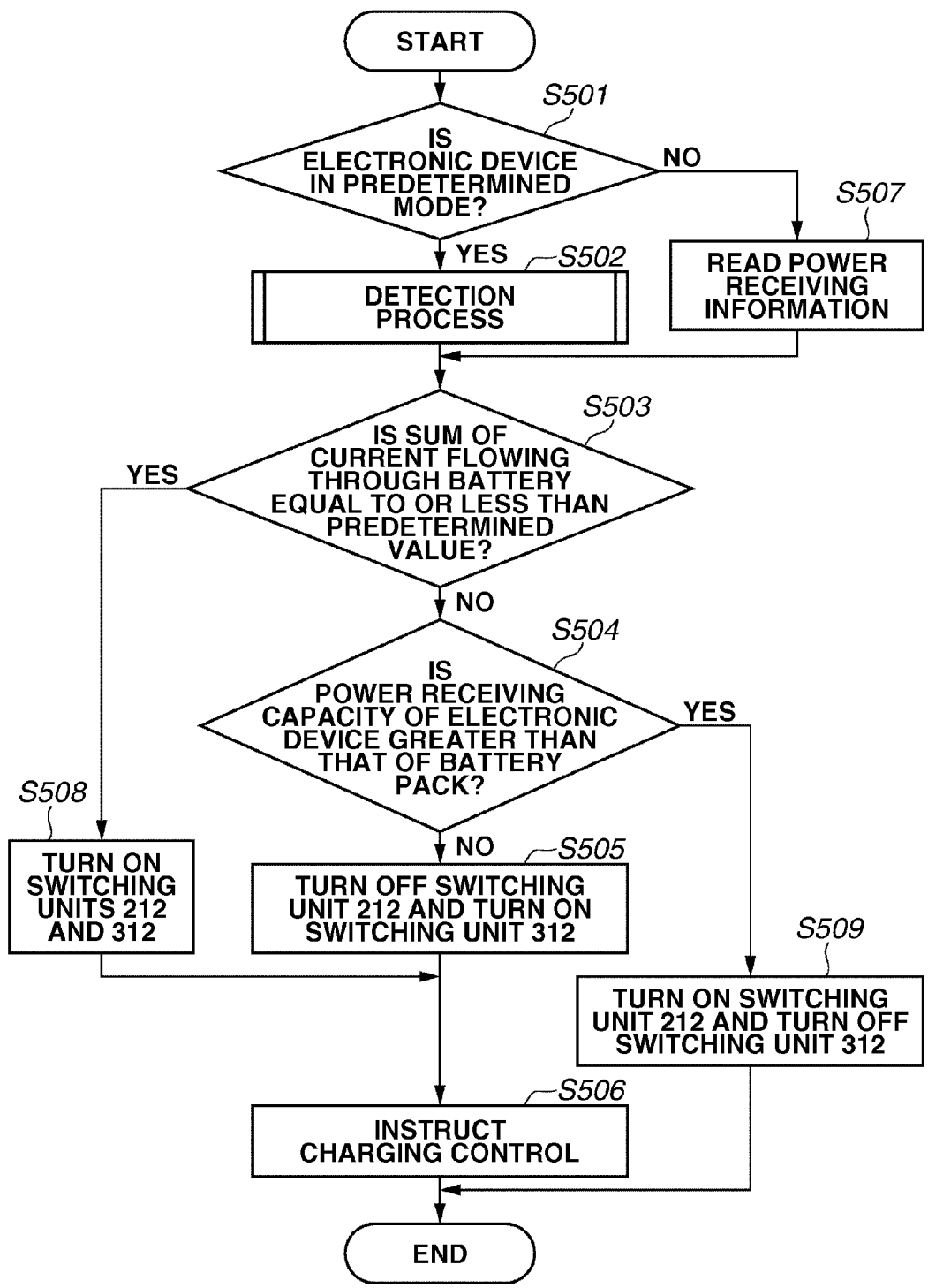

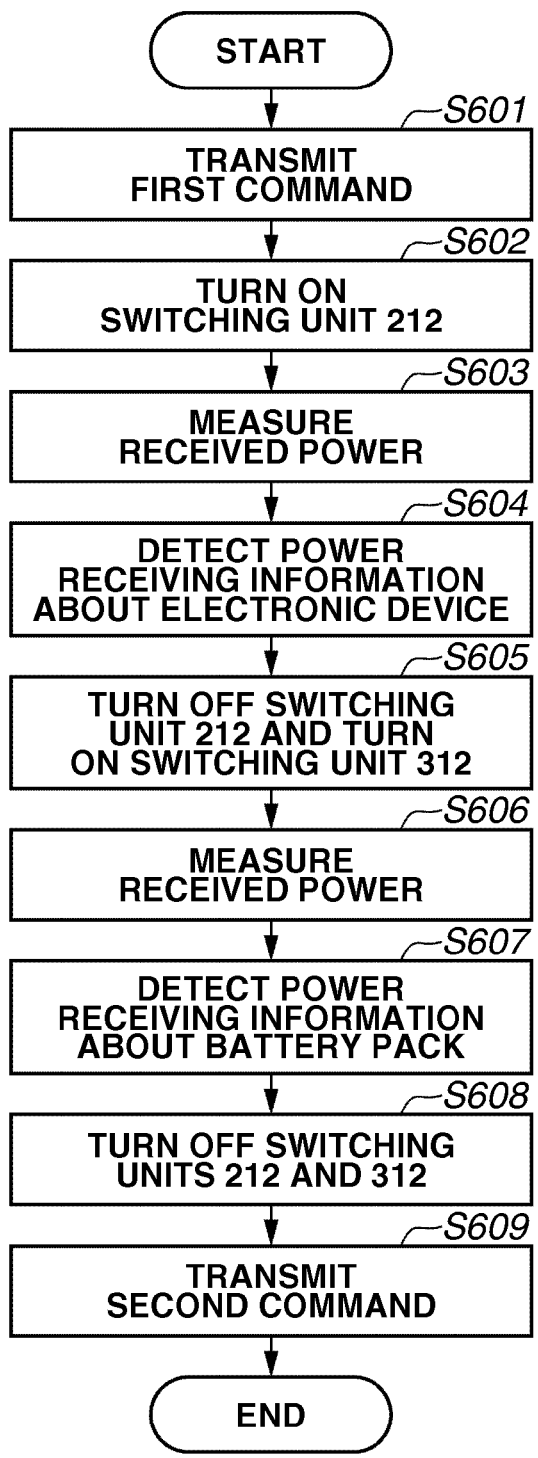

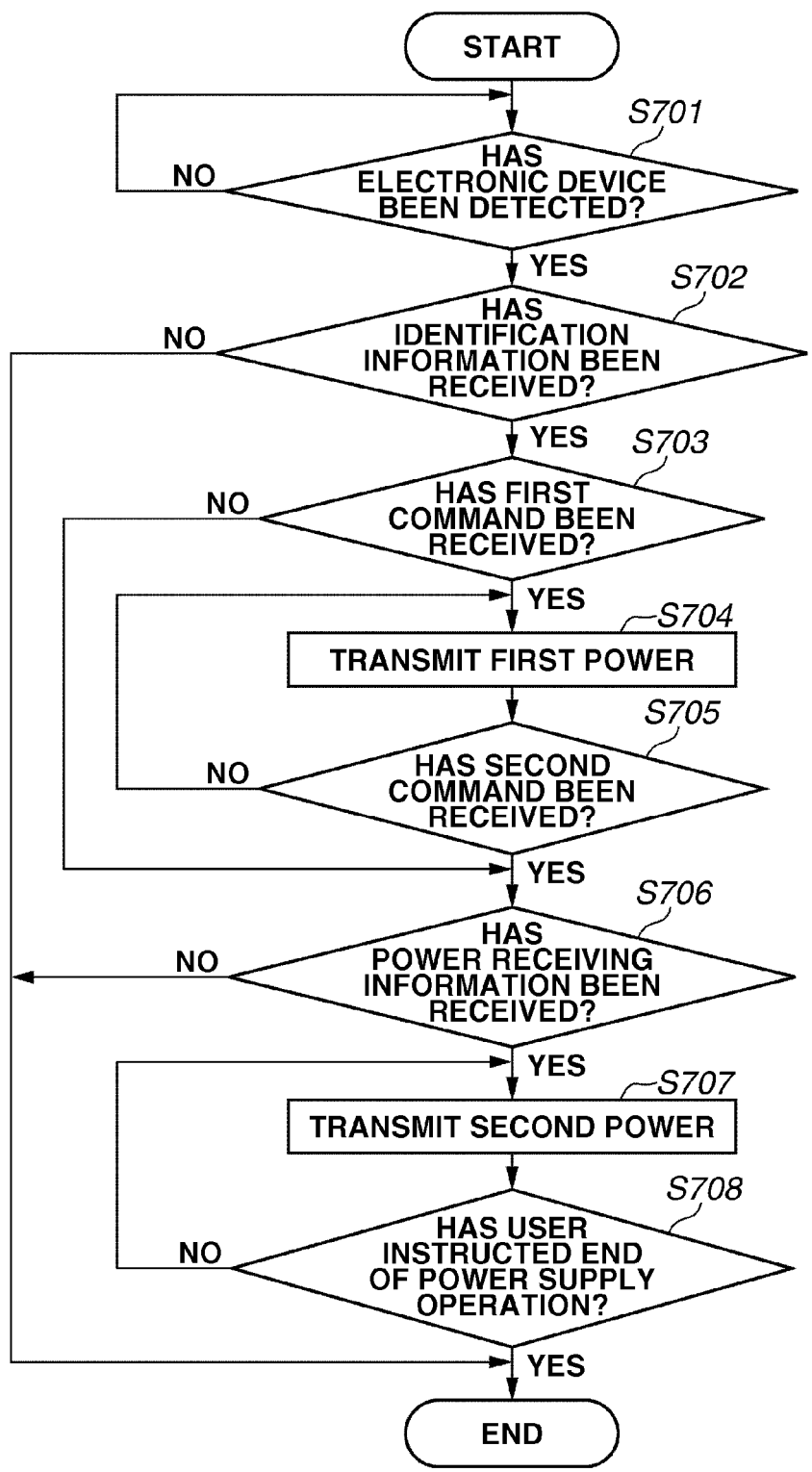

ELECTRONIC DEVICE, METHOD, AND STORAGE MEDIUM

BACKGROUND OF THE INVENTION

1. Field of the Invention

The present invention relates to an electronic device, a method, and a storage medium.

2. Description of the Related Art

In recent years, a conventional charging system has been used, which includes a power supply apparatus including a primary coil used for executing contactless power supply without using a connector and an electronic device including a secondary coil used for executing contactless power receiving supplied from the power supply apparatus. In the above-described charging system, the electronic device charges a battery, which is included in a battery pack mounted on the electronic device, with the power received by using the secondary coil.

Japanese Patent Application Laid-Open No. 10-021968 discusses a method for charging a battery within an electronic device by mounting a battery pack having a secondary coil for contactlessly receiving power from a power supply apparatus on the electronic device that does not include a component for contactlessly receiving the power from the power supply apparatus. If the above-described battery pack is mounted on an electronic device that has a unit that contactlessly receives power from a power supply apparatus, a battery included in the battery pack is charged with both power received by the battery pack and power received by the electronic device.

If the battery is charged in the above-described manner, the following problems may arise. More specifically, in this case, an overcurrent may be supplied to the battery. In addition, an overvoltage may be supplied to the battery.

SUMMARY OF THE INVENTION

The present invention is directed to an electronic device capable, if a battery pack having a unit that receives power supplied from a power supply apparatus is mounted on the electronic device, of executing a charge control for preventing an overcurrent to be supplied to a battery included in the battery pack.

According to an aspect of the present invention, an electronic device includes a first unit that wirelessly receives power from a power supply apparatus, and a control unit that executes control, if an external apparatus, including a second unit that wirelessly receives power from the power supply apparatus, and the electronic device are connected, to select at least one of the first unit and the second unit.

According to another aspect of the present invention, there is provided a method for controlling an electronic device including a first unit that wirelessly receives power from a power supply apparatus, the method comprising: executing control, if an external apparatus, including a second unit that wirelessly receives power from the power supply apparatus, and the electronic device are connected, to select at least one of the first unit and the second unit.

According to yet another aspect of the present invention there is provided a computer-readable storage medium storing a program executed by a computer, wherein the program for using the computer to perform a method for controlling an electronic device including a first unit that wirelessly receives power from a power supply apparatus. The method includes executing control, if an external apparatus, including a second unit that wirelessly receives power from the power supply apparatus, and the electronic device are connected, to select at least one of the first unit and the second unit.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 5 is a flowchart illustrating an example of selection process according to the first exemplary embodiment.

FIG. 6 is a flowchart illustrating an example of detection process according to the first exemplary embodiment.

FIG. 7 is a flowchart illustrating an example of power supply process according to the first exemplary embodiment.

DESCRIPTION OF THE EMBODIMENTS

Various exemplary embodiments, features, and aspects of the present invention will now be described in detail below with reference to the attached drawings.

Figure 1:
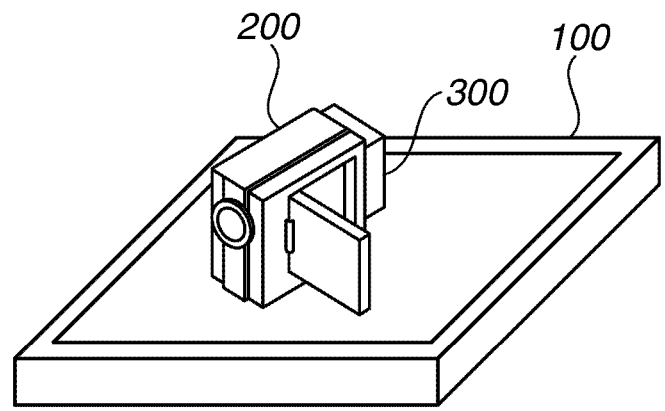
FIG. 1 illustrates an example of a charging system according to a first exemplary embodiment.

Referring to FIG. 1, a charging system according to a first exemplary embodiment of the present invention includes a power supply apparatus 100, an electronic device 200, and a battery pack 300. In the example illustrated in FIG. 1, the electronic device 200, on which the battery pack 300 is mounted, is placed on the power supply apparatus 100.

In the charging system described above, the power supply apparatus 100 executes contactless power supply for the electronic device 200 via a power supply antenna 108. In addition, if the distance between the power supply apparatus 100 and the electronic device 200 is within a predetermined range, the electronic device 200, which includes a power receiving antenna 201, executes contactless power receiving from the power supply apparatus 100 via the power receiving antenna 201. In addition, the electronic device 200 charges the battery 311 of the battery pack 300, which is mounted on the electronic device 200, with the power received from the power supply apparatus 100 via the power receiving antenna 201.

On the other hand, if the distance between the power supply apparatus 100 and the electronic device 200 is not within the predetermined range, the electronic device 200, even if the electronic device 200 includes a power receiving antenna 201, cannot receive power from the power supply apparatus 100. If the distance between the power supply apparatus 100 and the battery pack 300 is within the predetermined range, the battery pack 300 that includes a power receiving antenna 301 executes process for receiving contactless power supplied from the power supply apparatus 100 via the power receiving antenna 301.

In addition, the battery pack 300 having the power receiving antenna 301 can execute contactless charge the battery 311 with the power received from the power supply apparatus 100 without using the power receiving antenna 201. However, if the distance between the power supply apparatus 100 and the battery pack 300 is not within the predetermined range, the battery pack 300 cannot receive the power from the power supply apparatus 100 even if the battery pack 300 includes the power receiving antenna 301.

Of course, if the battery pack 300 does not have the power receiving antenna 301, the battery pack 300 cannot receive the power transmitted from the power supply apparatus 100. In that case, the electronic device 200 charges a battery 311, which is included in the battery pack 300, according to the power received by the electronic device 200 from the power supply apparatus 100.

In the present exemplary embodiment, the above-described "predetermined range" refers to a range in which the electronic device 200 or the battery pack 300 can communicate with the power supply apparatus 100. The power supply apparatus 100 can simultaneously execute contactless power supply to a plurality of electronic devices.

The electronic device 200 is a battery-operable apparatus operable with the power supplied from the battery 311, and may be for example an image capture apparatus, such as a digital still camera, a cellular phone with a camera, or a digital video camera, or a reproduction apparatus that reproduces audio data or video data, such as an audio player or a video player. In addition, a mobile apparatus driven by the power supplied from the battery 311, such as a vehicle and more particularly an automobile, can be used as the electronic device 200. Furthermore, any apparatus that includes a battery 311 and can be connected to the electronic device 200, such as an accessory apparatus or a peripheral apparatus, can be used as the battery pack 300.

Figure 2:
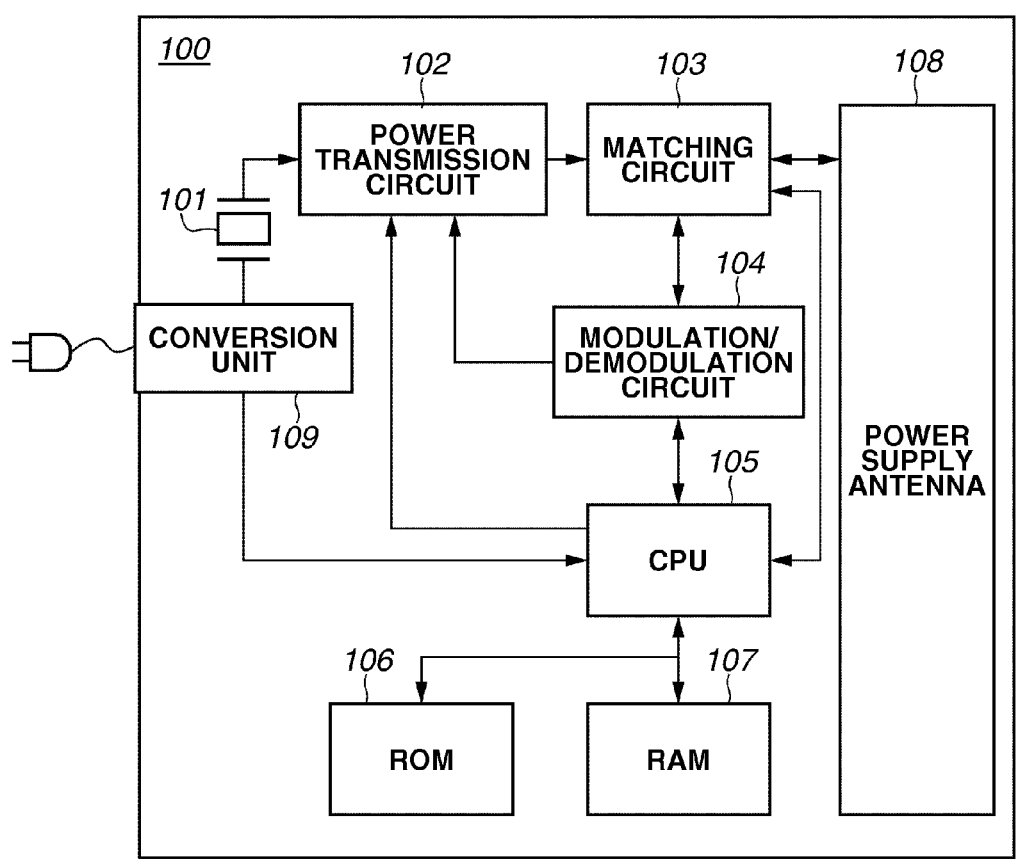
FIG. 2 is a block diagram illustrating an example of a power supply apparatus according to the first exemplary embodiment.

Referring to FIG. 2, the power supply apparatus 100 includes an oscillator 101, a power transmission circuit 102, a matching circuit 103, a modulation and demodulation circuit 104, a central processing unit (CPU) 105, a read-only memory (ROM) 106, a random access memory (RAM) 107, the power supply antenna 108, and a conversion unit 109.

The conversion unit 109 converts an AC power supplied by the AC power source (not illustrated) into a DC power. The oscillator 101 oscillates at a high frequency used for converting the direct current (DC) power, which is generated by the conversion unit 109, into a power corresponding to a target value determined by the CPU 105 and for supplying the converted power to the electronic device 200. The oscillator 101 is constituted by a crystal oscillator.

The power transmission circuit 102 generates power to be supplied to the electronic device 200 and the battery pack 300 via the power supply antenna 108 according to the frequency of oscillation by the oscillator 101. The power transmission circuit 102 includes a field effect transistor (FET). In addition, the power transmission circuit 102 generates power to be supplied to the electronic device 200 and the battery pack 300 by controlling a current flowing between a source terminal and a drain terminal of the FET according to the frequency of the oscillation by the oscillator 101. The power generated by the power transmission circuit 102 is supplied to the matching circuit 103.

The matching circuit 103 is a resonance circuit for generating a resonance between the power supply antenna 108 and either one of the power receiving antenna 201 and the power receiving antenna 301 according to the frequency of the oscillation by the oscillator 101. The matching circuit 103 includes a variable capacitor, a variable impedance, and a variable resistor. In addition, the matching circuit 103 matches impedance between the power transmission circuit 102 and the power supply antenna 108.

The CPU 105 controls the values of the variable capacitor, the variable impedance, and the variable resistor of the matching circuit 103 to adjust the frequency of oscillation by the oscillator 101 to a resonance frequency f. The resonance frequency f is a frequency of the resonance between the power supply antenna 108 and at least one of the power receiving antenna 201 and the power receiving antenna 301. In addition, the matching circuit 103 can detect a change of current flowing to the power supply antenna 108 and a change of voltage supplied to the power supply antenna 108.

The modulation and demodulation circuit 104 modulates the power generated by the power transmission circuit 102 according to a predetermined protocol to transmit a command for controlling the electronic device 200 and the battery pack 300 to the electronic device 200 and the battery pack 300. In the present exemplary embodiment, the "predetermined protocol" is a communication protocol used for radio frequency identification (RFID), for example in accordance with International Organization for Standardization (ISO) 14443 or ISO15693.

The power generated by the power transmission circuit 102 is converted by the modulation and demodulation circuit 104 into a pulse signal as a command for communication with the electronic device 200 and the battery pack 300. The converted pulse signal is then transmitted to the electronic device 200 and the battery pack 300.

The pulse signal transmitted to the electronic device 200 is recognized as bit data including information "1" and information "0" by an analysis executed by the electronic device 200. The command includes identification information for identifying an address of the destination of the command and command codes, which describes an operation instructed by the command. Furthermore, the CPU 105 controls the modulation and demodulation circuit 104 to change the identification information included in the command. Accordingly, the CPU 105 can execute control for transmitting the command only to the electronic device 200 or the battery pack 300.

The modulation and demodulation circuit 104 converts the power generated by the power transmission circuit 102 into a pulse signal by executing an amplitude shift keying (ASK) modulation using amplitude displacement. The ASK modulation is often used for a communication between an integrated circuit (IC) card and an IC card reader.

The modulation and demodulation circuit 104 converts the power generated by the power transmission circuit 102 into a pulse signal by changing the amplitude of the power generated by the power transmission circuit 102 by switching an analog multiplier and a load resistor included in the modulation and demodulation circuit 104. In addition, the modulation and demodulation circuit 104 includes a coding circuit that executes coding by a predetermined coding format. Furthermore, the modulation and demodulation circuit 104 receives and demodulates information and a command transmitted from the electronic device 200 and the battery pack 300.

If the power for a communication from the power supply apparatus 100 has been supplied to the electronic device 200, the electronic device 200 changes the load on the apparatus in relation to the power supplied from the power supply apparatus 100. By executing the above-described process, the electronic device 200 transmits predetermined information and a command, which are generated according to a load modulation method, to the power supply apparatus 100.

Accordingly, in receiving the predetermined information and the command from the electronic device 200, the modulation and demodulation circuit 104 demodulates the predetermined information and the command according to a change of the current flowing to the power supply antenna 108, which is detected by the matching circuit 103, and supplies the information and the command to the CPU 105. In addition, in receiving information and a command generated according to a load modulation method from the battery pack 300, the modulation and demodulation circuit 104 executes an operation similar to an operation executed when the modulation and demodulation circuit 104 receives the information and the command generated according to the load modulation method from the electronic device 200.

If the AC power source (not illustrated) and the power supply apparatus 100 are connected with each other, the CPU 105 controls the power supply apparatus 100 by using a DC power supplied from the AC power source (not illustrated) via the conversion unit 109. In addition, the CPU 105 controls an operation of the power supply apparatus 100 by executing a computer program stored on the ROM 106.

The CPU 105 controls the power transmission circuit 102 to control the power to be supplied to the electronic device 200 and the battery pack 300. In addition, the CPU 105 controls the modulation and demodulation circuit 104 to transmit a command to the electronic device 200.

Furthermore, the CPU 105 controls the matching circuit 103 to control the power supply apparatus 100 to generate a resonation with at least one of the electronic device 200 and the battery pack 300.

The ROM 106 stores a computer program for controlling the operation of the power supply apparatus 100. In addition, the ROM 106 stores information, such as a parameter for the operation of the power supply apparatus 100. The RAM 107 is a rewritable non-volatile memory that temporarily stores the computer program for controlling an operation of the components of the power supply apparatus 100, the information about the operation of the power supply apparatus 100, such as a parameter, and the information received by using the modulation and demodulation circuit 104 from the electronic device 200.

The power supply antenna 108 outputs the power generated by the power transmission circuit 102 to the electronic device 200 and the battery pack 300. The power supply apparatus 100 transmits power and a command to the electronic device 200 and the battery pack 300 via the power supply antenna 108. In addition, the power supply apparatus 100 receives a command and a response signal from the electronic device 200 and the battery pack 300 via the power supply antenna 108.

If the AC power source (not illustrated) is connected, the conversion unit 109 converts an AC power supplied by the AC power source (not illustrated) into a DC power. In addition, the conversion unit 109 supplies the converted DC power to the power supply apparatus 100.

Now, the electronic device 200 will be described in detail below with reference to FIG. 3. In the present exemplary embodiment, a digital still camera will be described as an example of the electronic device 200 with reference to FIG. 3.

Figure 3:
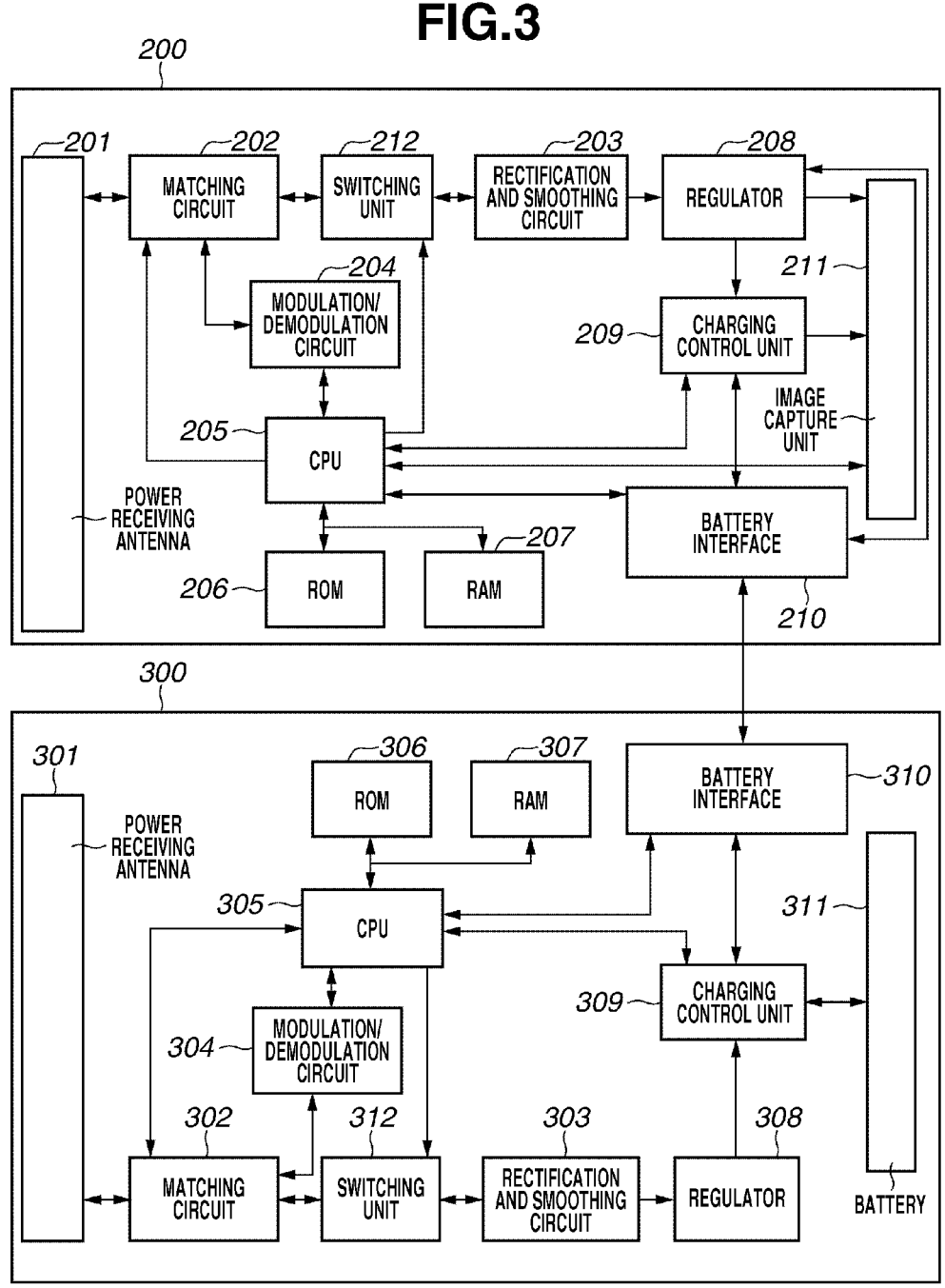
FIG. 3 is a block diagram illustrating an example of an electronic device and a battery pack according to the first exemplary embodiment.

Referring to FIG. 3, the electronic device 200 includes the power receiving antenna 201, a matching circuit 202, a rectification and smoothing circuit 203, a modulation and demodulation circuit 204, a CPU 205, a ROM 206, a RAM 207, a regulator 208, a charging control unit 209, a battery interface 210, an image capture unit 211, and a switching unit 212.

The power receiving antenna 201 is an antenna for receiving the power supplied from the power supply apparatus 100. In addition, the electronic device 200 receives the power and a command from the power supply apparatus 100 via the power receiving antenna 201. Furthermore, the electronic device 200 transmits a command and a response signal from the electronic device 200 via the power receiving antenna 201.

The matching circuit 202 is a resonance circuit for matching the impedance to generate a resonance between the power supply apparatus 100 and the power receiving antenna 201 by using the same frequency as the resonance frequency f of the power supply apparatus 100. The matching circuit 202 includes a variable capacitor, a variable impedance, and a variable resistor. The CPU 205 controls values of the variable capacitor, the variable impedance, and the variable resistor of the matching circuit 202 to generate the resonance between the power supply apparatus 100 and the power receiving antenna 201 at the same frequency as the resonance frequency f of the power supply apparatus 100.

In addition, the matching circuit 202 receives power that has been received by the power receiving antenna 201 and supplied from the power receiving antenna 201 via the switching unit 212. In addition, the matching circuit 202 supplies the received power to the rectification and smoothing circuit 203.

The rectification and smoothing circuit 203 eliminates the command and a noise from the power received by the power receiving antenna 201 and generate a DC power used for charging the battery 311. In addition, the rectification and smoothing circuit 203 supplies the generated DC power to the regulator 208. Furthermore, the rectification and smoothing circuit 203 supplies the generated DC power to the regulator 208.

Moreover, the rectification and smoothing circuit 203 supplies the command that has been eliminated from the power received by the power receiving antenna 201 to the modulation and demodulation circuit 204. The rectification and smoothing circuit 203 includes a rectification diode and generates the DC power by using either one of full-wave rectification and half-wave rectification.

The modulation and demodulation circuit 204 analyzes the command supplied from the rectification and smoothing circuit 203 according to a predetermined communication protocol used for the communication with the power supply apparatus 100. In addition, the modulation and demodulation circuit 204 transmits a result of the analysis on the command to the CPU 205.

If the power for the communication between the power supply apparatus 100 and the electronic device 200 has been supplied from the power supply apparatus 100 to the electronic device 200, the CPU 205 controls the modulation and demodulation circuit 204 to cause the load included in the modulation and demodulation circuit 204 to vary to transmit a command and predetermined information to the power supply apparatus 100.

If the load existing in the modulation and demodulation circuit 204 changes, then the current supplied to the power supply antenna 108 changes. Accordingly, the power supply apparatus 100 receives the predetermined information and the command by detecting the change of the current supplied to the power supply antenna 108.

The CPU 205 determines the type of the received command according to the analysis result supplied from the modulation and demodulation circuit 204. In addition, the CPU 205 controls the electronic device 200 to execute an operation indicated by command codes corresponding to the received command. Furthermore, the CPU 205 executes a computer program stored on the ROM. 206 to control an operation of the electronic device 200.

The ROM 206 stores the computer program for controlling the operation of the electronic device 200. In addition, the ROM 206 stores information about the operation of the electronic device 200, such as a parameter. Furthermore, identification information and power receiving information about the electronic device 200 are stored in the ROM 206. The identification information about the electronic device 200 includes an ID, the name of the manufacturer, the apparatus name, and the date of manufacture of the electronic device 200.

The power receiving information about the electronic device 200 includes information about the maximum power that the power receiving antenna 201 can receive, a maximum threshold value of the current to be supplied to the battery 311 in charging the battery 311, and a maximum threshold value of the voltage to be supplied to the battery 311 in charging the battery 311.

The maximum threshold value of the current to be supplied to the battery 311 in charging the battery 311, which is included in the power receiving information about the electronic device 200, refers to a threshold value of the current supplied to the battery 311 in charging the battery 311 according to the power received by the power receiving antenna 201. Furthermore, the maximum threshold value of the voltage to be supplied to the battery 311 in charging the battery 311, which is included in the power receiving information about the electronic device 200, refers to a threshold value of the voltage to be supplied to the battery 311 in charging the battery 311 according to the power received by the power receiving antenna 201.

In addition, the power receiving information about the electronic device 200 can include efficiency information and area information. The efficiency information is information about how high the power received by the power receiving antenna 201 can be in relation to the power supplied from the power supply apparatus 100. The area information is information about the area of the power receiving antenna 201.

The RAM 207 is a rewritable non-volatile memory. The RAM 207 temporarily stores a computer program for controlling an operation of the electronic device 200, information about the operation of the electronic device 200, such as a parameter, information received from the power supply apparatus 100, and information acquired from the battery pack 300.

The regulator 208 controls the voltage of the DC power supplied from the rectification and smoothing circuit 203 so that the voltage of the DC power is equal to a voltage value set by the CPU 205. The regulator 208 can be either a switching regulator or a linear regulator. The DC power controlled so that voltage of the DC power is equal to the voltage value set by the CPU 205, which is supplied from the rectification and smoothing circuit 203 via the regulator 208, is supplied to the charging control unit 209.

In addition, the regulator 208 controls the voltage of the power supplied from the battery 311 so that the voltage of the power supplied from the battery 311 is equal to a voltage value set by the CPU 205. The DC power controlled so that the voltage of the power supplied from the battery 311 is equal to the voltage value set by the CPU 205, which is supplied from the battery 311 via the regulator 208, is supplied to the CPU 205, the ROM 206, the RAM 207, and the image capture unit 211.

If the battery pack 300 is mounted on the electronic device 200 and if the DC power is supplied from the regulator 208 to the charging control unit 209, then the charging control unit 209 charges the battery 311. In addition, the charging control unit 209 detects remaining capacity information about the battery 311 of the battery pack 300 that is mounted on the electronic device 200. In addition, the charging control unit 209 supplies the detected remaining capacity information about the battery 311 to the CPU 205.

The CPU 205 records the information about the remaining capacity of (the remaining capacity information about) the battery 311, which has been supplied from the charging control unit 209, on the RAM 207. In charging the battery 311, the charging control unit 209 detects the current and the voltage to be supplied to the battery 311 and supplies the detected information to the CPU 205.

The CPU 205 records the information about the current to be supplied to the battery 311 and the information about the voltage to be supplied to the battery 311, which have been supplied by the charging control unit 209, on the RAM 207. The charging control unit 209 can detect the remaining capacity information about the battery 311 by acquiring remaining capacity information about the battery 311 detected by the battery pack 300. Alternatively, the charging control unit 209 can calculate the remaining capacity information about the battery 311 based on the current supplied to the battery 311 and the voltage supplied to the battery 311.

The battery interface 210 is an interface for a communication with the battery pack 300 detachably mounted on the electronic device 200. The battery interface 210 can communicate with the battery pack 300 either by wired communication or wireless communication. The battery interface 210 supplies the power received from the power supply apparatus 100 to the battery pack 300 according to an instruction from the CPU 205. In addition, the battery interface 210 supplies the power received from the battery pack 300 to the image capture unit 211 via the regulator 208.

If an instruction for controlling the battery pack 300 has been input by the CPU 205, the instruction for controlling the battery pack 300 is supplied to a CPU 305 via the battery interface 210. In addition, if an instruction for controlling the electronic device 200 has been input by the CPU 305, then the instruction for controlling the electronic device 200 is supplied to the CPU 205 via the battery interface 210.

The image capture unit 211 includes an image sensor, an image processing circuit, and a compression/decompression circuit. The image sensor generates video data based on an optical image of an object. The image processing circuit executes image processing on the video data generated by the image sensor. The compression/decompression circuit compresses the video data and decompresses compressed video data.

The image capture unit 211 shoots video data of the object. In addition, the image capture unit 211 records the video data, such as a still image or moving image taken as a result of the shooting, on a recording medium (not illustrated). An external recording medium that can be detachably mounted on the electronic device 200 can be used as the recording medium (not illustrated). Alternatively, the recording medium (not illustrated) can be built into the electronic device 200. The switching unit 212 is a switch for connecting between the matching circuit 202 and the rectification and smoothing circuit 203.

The CPU 205 executes control for connecting between the matching circuit 202 and the rectification and smoothing circuit 203 by turning on the switching unit 212. In addition, the CPU 205 executes control for disconnecting between the matching circuit 202 and the rectification and smoothing circuit 203 by turning off the switching unit 212.

The switching unit 212 can be a relay switch. Alternatively, a switch previously provided to the matching circuit 202 of the electronic device 200 can be utilized as the switching unit 212. If the switching unit 212 has been turned on, the electronic device 200 can receive the power and the command supplied from the power supply apparatus 100 via the power receiving antenna 201. In addition, in this case, the electronic device 200 can transmit the command to the power supply apparatus 100 via the power receiving antenna 201.

If the switching unit 212 has been turned off, the electronic device 200 cannot receive the power supplied from the power supply apparatus 100. However, in this case, the electronic device 200 can receive the command transmitted from the power supply apparatus 100 via the power receiving antenna 201 and can transmit the command to the power supply apparatus 100.

Referring to FIG. 3, the battery pack 300 includes the power receiving antenna 301, a matching circuit 302, a rectification and smoothing circuit 303, a modulation and demodulation circuit 304, a CPU 305, a ROM 306, a RAM 307, a regulator 308, a charging control unit 309, a battery interface 310, and the battery 311.

The battery pack 300 can be detachably mounted on the electronic device 200. If the battery pack 300 has been mounted on the electronic device 200, the battery interface 210 of the electronic device 200 is connected to the battery interface 310 of the battery pack 300.

The power receiving antenna 301, the matching circuit 302, the rectification and smoothing circuit 303, and the modulation and demodulation circuit 304 of the battery pack 300 include the same function as the function of and execute the same operation as the operation of the power receiving antenna 201, the matching circuit 202, the rectification and smoothing circuit 203, and the modulation and demodulation circuit 204, respectively.

The CPU 305, the ROM 306, the RAM 307, the regulator 308, and the charging control unit 309 of the battery pack 300 include the same functions as the functions of and execute the same operations as the operations of the CPU 205, the ROM 206, the RAM 207, the regulator 208, and the charging control unit 209, respectively.

The CPU 305 determines the type of the received command according to a result of an analysis, which is supplied from the modulation and demodulation circuit 304. In addition, the CPU 305 controls the battery pack 300 to execute an operation indicated by command codes corresponding to the received command.

Furthermore, the CPU 305 controls the operation of the battery pack 300 by executing a computer program stored on the ROM 306. If an instruction for controlling the battery pack 300 has been input by the electronic device 200 via the battery interface 310, then the CPU 305 analyzes the instruction for controlling the battery pack 300 and controls the battery pack 300 according to a result of the analysis.

The ROM 306 stores the computer program for controlling the operation of the battery pack 300 and information about the operation of the battery pack 300, such as a parameter. In addition, the ROM 306 records identification information about the battery pack 300, power receiving information about the battery pack 300, charging information about the battery 311, and information indicating that the battery pack 300 includes the power receiving antenna 301.

For example, the identification information about the battery pack 300 includes the ID, the name of the manufacturer, the apparatus name, and the date of manufacture of the battery pack 300. The power receiving information about the battery pack 300 includes information about the maximum power that the power receiving antenna 301 can receive, a maximum threshold value of the current to be supplied to the battery 311 in charging the battery 311, and a maximum threshold value of the voltage to be supplied to the battery 311 in charging the battery 311.

In addition, the power receiving information about the battery pack 300 can include efficiency information and area information. The efficiency information is information about how high the power received by the power receiving antenna 301 can be in relation to the power supplied from the power supply apparatus 100. The area information is information about the area of the power receiving antenna 301.

The maximum threshold value of the current to be supplied to the battery 311 in charging the battery 311, which is included in the power receiving information about the battery pack 300, refers to a threshold value of the current supplied to the battery 311 in charging the battery 311 according to the power received by the power receiving antenna 301. Furthermore, the maximum threshold value of the voltage to be supplied to the battery 311 in charging the battery 311, which is included in the power receiving information about the battery pack 300, refers to a threshold value of the voltage to be supplied to the battery 311 in charging the battery 311 according to the power received by the power receiving antenna 301.

The charging information about the battery 311 includes a permissible current value and a permissible voltage value. The permissible current value is a threshold value of the current permitted for charging the battery 311. The permissible voltage value is a threshold value of the voltage permitted for charging the battery 311.

The battery interface 310 supplies the power received from the power supply apparatus 100 via the power receiving antenna 301 to the battery 311 and supplies the power received from the battery 311 to the electronic device 200 according to an instruction input by the CPU 305. In addition, if an instruction for controlling the battery pack 300 has been input by the electronic device 200, the instruction for controlling the battery pack 300 is supplied to the CPU 305 via the battery interface 310.

Furthermore, if the instruction for controlling the electronic device 200 has been input by the CPU 305, the instruction for controlling the electronic device 200 is supplied to the electronic device 200 via the battery interface 310.

The battery 311 is a battery that can be detachably mounted on the electronic device 200. In addition, the battery 311 is a secondary battery that can be charged. For example, a lithium ion (Li) battery can be used as the battery 311.

A switching unit 312 is a switch for connecting between the matching circuit 302 and the rectification and smoothing circuit 303. The CPU 305 executes control for connecting between the matching circuit 302 and the rectification and smoothing circuit 303 by turning on the switching unit 312. In addition, the CPU 305 executes control for disconnecting between the matching circuit 302 and the rectification and smoothing circuit 303 by turning off the switching unit 312.

The switching unit 312 can be a relay switch. Alternatively, a switch previously provided to the matching circuit 302 of the battery pack 300 can be utilized as the switching unit 312. If the switching unit 312 has been turned on, the battery pack 300 can receive the power and the command supplied from the power supply apparatus 100 via the power receiving antenna 301. On the other hand, if the switching unit 312 has been turned off, the battery pack 300 cannot receive the power supplied from the power supply apparatus 100. However, in this case, the battery pack 300 can receive the command transmitted from the power supply apparatus 100 via the power receiving antenna 301.

In the charging system according to the present exemplary embodiment, the power supply apparatus 100 can supply power to the electronic device 200 and the battery pack 300 by electromagnetic induction and the electronic device 200 and the battery pack 300 can receive the power from the power supply apparatus 100 by electromagnetic induction.

Alternatively, in the charging system according to the present exemplary embodiment, the power supply apparatus 100 can supply power to the electronic device 200 and the battery pack 300 by magnetic field resonance and the electronic device 200 and the battery pack 300 can receive the power from the power supply apparatus 100 by magnetic field resonance.

Further alternatively, in the charging system according to the present exemplary embodiment, the power supply apparatus 100 can supply power to the electronic device 200 and the battery pack 300 by electric field resonance and the electronic device 200 and the battery pack 300 can receive the power from the power supply apparatus 100 by electric field resonance.

A helical antenna, a loop antenna, or a flat-shaped antenna, such as a meander line antenna, can be used as the power supply antenna 108, the power receiving antenna 201, and the power receiving antenna 301. In addition, the present invention can also be implemented by the following system. More specifically, in this case, an electrode is provided to the power supply apparatus 100 instead of the power supply antenna 108 and to the electronic device 200 instead of the power receiving antenna 201. Furthermore, the power supply apparatus 100 can execute contactless power supply to the electronic device 200.

Further alternatively, the present invention can also be implemented by the following system. In this case, in the system, an electrode is provided to the power supply apparatus 100 instead of the power supply antenna 108 and an electrode is provided to the battery pack 300 instead of the power receiving antenna 301. Furthermore, the power supply apparatus 100 can execute contactless power supply to the battery pack 300.

Yet further alternatively, the present invention can be implemented by a system in which the power supply apparatus 100 can execute contactless power supply to the electronic device 200 and the battery pack 300 by electric field coupling.

In the present exemplary embodiment, the power supply apparatus 100 can execute contactless power supply to the electronic device 200 and the battery pack 300 and the electronic device 200 and the battery pack 300 can execute contactless power receiving the power from the power supply apparatus 100. However, the term "contactless" can be translated as "by wireless", "wirelessly" or "by a non-contact transmission".

Now, a charging process according to the present exemplary embodiment, which is executed by the electronic device 200, will be described in detail below with reference to the flow chart of FIG. 4. The charging process may be realized by the CPU 205 executing the computer program from the ROM 206.

In the present exemplary embodiment, it is supposed that before starting the charging process by the CPU 205, the switching unit 212 has been already turned on and a predetermined power for the communication between the power supply apparatus 100 and the electronic device 200 has already been supplied from the power supply apparatus 100 to the electronic device 200.

Figure 4:
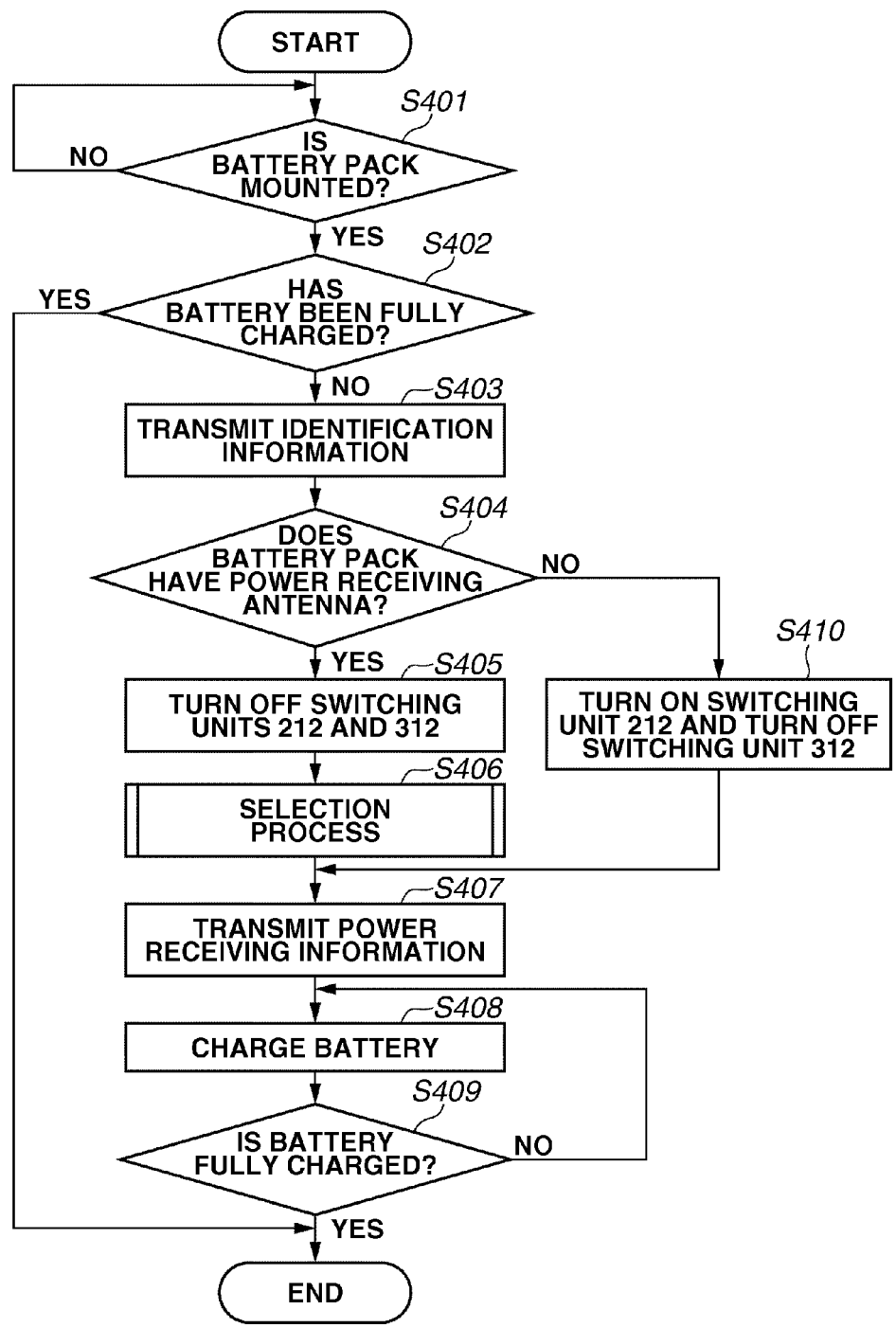
FIG. 4 is a flowchart illustrating an example of charging process according to the first exemplary embodiment.

Referring to FIG. 4, in step S401, the CPU 205 determines whether the battery pack 300 has been mounted on the electronic device 200. More specifically, the CPU 205 determines whether the battery pack 300 has been mounted on the electronic device 200 by executing a determination as to whether the battery interface 210 of the electronic device 200 has been connected to the battery interface 310 of the battery pack 300.

If it is determined that the battery interface 210 of the electronic device 200 has not been connected to the battery interface 310 of the battery pack 300, the CPU 205 determines that the battery pack 300 has not been mounted on the electronic device 200 (NO in step S401) and then the process repeats the process in step S401.

On the other hand, if it is determined that the battery interface 310 of the battery pack 300 has been connected to the battery interface 210 of the electronic device 200, the CPU 205 determines that the battery pack 300 has been mounted on the electronic device 200 (YES in step S401) and then the process advances from step S401 to step S402.

In step S402, the CPU 205 determines whether the battery 311 has been fully charged. Furthermore, in step S402, the CPU 205 inputs an instruction to the battery pack 300 for requesting the battery pack 300 to transmit the identification information about the battery pack 300, the remaining capacity information about the battery 311, the charging information about the battery 311, and the information about whether the battery pack 300 includes the power receiving antenna 301. In the following description, the instruction input to the battery pack 300 for requesting the battery pack 300 to transmit the identification information about the battery pack 300, the remaining capacity information about the battery 311, the charging information about the battery 311, and the information about whether the battery pack 300 includes the power receiving antenna 301 will be simply referred to as a "first instruction".

If the battery pack 300 has received the first instruction from the electronic device 200, the CPU 305 reads the identification information about the battery pack 300, the charging information about the battery 311, and the information about whether the battery 311 includes the power receiving antenna 301 from the ROM 306. In addition, in this case, the CPU 305 requests the charging control unit 309 to transmit the remaining capacity information about the battery 311.

In addition, when the first instruction has been received, the CPU 305 transmits the remaining capacity information about the battery 311, the identification information about the battery 311, the charging information about the battery 311, and the information about whether the battery pack 300 includes the power receiving antenna 301 to the electronic device 200. When the above-described information is received, the CPU 205 records the remaining capacity information about the battery 311, the identification information about the battery 311, the charging information about the battery 311, and the information about whether the battery pack 300 includes the power receiving antenna 301 on the RAM 207.

In step S402, the CPU 205 determines whether the battery 311 has been fully charged according to the remaining capacity information about the battery 311, which has been recorded on the RAM 207. If it is determined that the battery 311 has been fully charged (YES in step S402), then the process ends.

On the other hand, if it is determined that the battery 311 has not been fully charged (NO in step S402), then the process advances from step S402 to step S403.

In step S403, the CPU 205 executes control of the matching circuit 202 and the modulation and demodulation circuit 204 for transmitting the identification information about the electronic device 200, which has been recorded on the ROM 206, and the identification information about the battery pack 300, which has been recorded on the RAM 207, to the power supply apparatus 100.

After the identification information about the electronic device 200, which has been recorded on the ROM 206, and the identification information about the battery pack 300, which has been recorded on the RAM 207, are transmitted to the power supply apparatus 100 in step S403, the process advances from step S403 to step S404.

Alternatively, in step S403, the CPU 205 can control the matching circuit 202 and the modulation and demodulation circuit 204 to transmit the identification information about the electronic device 200 to the power supply apparatus 100 and can instruct the battery pack 300 to transmit the identification information about the battery pack 300 to the power supply apparatus 100. In this case, when the instruction is received, the CPU 305 controls the matching circuit 302 and the modulation and demodulation circuit 304 to transmit the identification information about the battery pack 300, which has been recorded on the ROM 306, to the power supply apparatus 100 via the power receiving antenna 301.

In step S404, the CPU 205 determines whether the battery pack 300 includes the power receiving antenna 301. The determination as to whether the battery pack 300 includes the power receiving antenna 301 can be determined according to the information about whether the battery pack 300 includes the power receiving antenna 301, which has been acquired by the CPU 205 from the battery pack 300. Alternatively, the determination as to whether the battery pack 300 includes the power receiving antenna 301 can be determined by inputting an inquiry by the CPU 205 to the battery pack 300 about whether the power receiving antenna 301 has been provided.

If it is determined that the battery pack 300 includes the power receiving antenna 301 (YES in step S404), then the process advances from step S404 to step S405. On the other hand, if it is determined that the battery pack 300 does not include the power receiving antenna 301 (NO in step S404), then the process advances from step S404 to step S410.

In step S405, the CPU 205 executes control for turning off the switching unit 212 and inputs an instruction to the battery pack 300 for turning off the switching unit 312. Then, the process advances from step S405 to step S406.

In step S406, the CPU 205 executes a selection process for selecting at least one of the power receiving antenna 201 and the power receiving antenna 301. The selection process is process for executing charging with the power supplied from at least one of the power receiving antenna 201 and the power receiving antenna 301.

After the selection process by the CPU 205 in step S406 is completed, the CPU 205 executes control for charging the battery 311 with the power supplied from the power receiving antenna selected by the selection process. After the selection process in step S406 is completed, the process advances from step S406 to step S407. The selection process in step S406 will be described in detail below.

In step S407, the CPU 205 executes control for transmitting power receiving information to the power supply apparatus 100. If the power receiving antenna 201 has been selected as a result of the selection process in step S406, then the CPU 205 controls the matching circuit 202 and the modulation and demodulation circuit 204 to transmit the power receiving information about the electronic device 200, which has been read from the ROM 206, to the power supply apparatus 100 via the power receiving antenna 201.

As another exemplary case, if the power receiving antenna 301 has been selected as a result of the selection process in step S406, the CPU 205 inputs an instruction to the battery pack 300 for transmitting the power receiving information about the battery pack 300, which has been recorded on the ROM 306, to the power supply apparatus 100. In the following description, the instruction for controlling the battery pack 300 to transmit the power receiving information about the battery pack 300 to the power supply apparatus 100 will be simply referred to as a "second instruction".

As yet another exemplary case, if the power receiving antenna 201 and the power receiving antenna 301 have both been selected as a result of the selection process in step S406, the CPU 205 controls the matching circuit 202 and the modulation and demodulation circuit 204 to transmit the power receiving information about the power receiving antenna 201 to the power supply apparatus 100. In addition, the CPU 205 inputs the second instruction to the battery pack 300. When the second instruction is received by the battery pack 300, the CPU 305 controls the matching circuit 202 and the modulation and demodulation circuit 204 to transmit the power receiving information about the battery pack 300, which has been read from the ROM 306, to the power supply apparatus 100.

After at least one piece of information of the power receiving information about the electronic device 200 or the power receiving information about the battery pack 300 is transmitted to the power supply apparatus 100 in step S407, the process advances from step S407 to step S408. In step S408, the CPU 205 executes control for charging the battery 311 with the power received by the power receiving antenna selected by the selection process in step S406.

For example, if the power receiving antenna 201 has been selected by the selection process in step S406, in supplying the power for charging from the power supply apparatus 100 to the electronic device 200, the power receiving antenna 201 receives the power supplied from the power supply apparatus 100. The CPU 205 controls the electronic device 200 to supply the power received by the power receiving antenna 201 to the battery pack 300 via the matching circuit 202, the rectification and smoothing circuit 203, the regulator 208, the charging control unit 209, and the battery interface 210.

In receiving the power from the electronic device 200, the battery pack 300 receives the power from the electronic device 200 via the battery interface 310. In addition, the power received by the battery interface 310 from the electronic device 200 is then supplied to the battery 311 via the charging control unit 309.

Furthermore, the CPU 205 controls the charging control unit 209 to start the charging of the battery 311. Under control of the CPU 205, the charging control unit 209 controls the current for charging the battery 311 and the voltage for charging the battery 311 and detects the remaining capacity information about the battery 311.

In this state, the switching unit 312 remains to be off. Furthermore, the power receiving antenna 201 and the matching circuit 202 are used to receive the power from the power supply apparatus 100. The circuits, units, or members included in the electronic device 200 used in receiving the power supplied from the power supply apparatus 100, such as the power receiving antenna 201 and the matching circuit 202, will be hereafter collectively referred to as a "first receiving unit(s)" or "first receiving means".

As yet another case, if the power receiving antenna 301 has been selected as a result of the selection process in step S406, in supplying the power for charging the battery 311 from the power supply apparatus 100 to the battery pack 300, the power receiving antenna 301 receives the power from the power supply apparatus 100. The CPU 305 controls the battery pack 300 to supply the power received by the power receiving antenna 301 to the battery 311 via the matching circuit 302, the rectification and smoothing circuit 303, the regulator 308, and the charging control unit 309.

The CPU 205 inputs an instruction for charging the battery 311 to the battery pack 300. When the instruction is received, the CPU 305 controls the charging control unit 309 to start the charging of the battery 311. Subsequently, the charging control unit 309 controls the current for charging the battery 311 and the voltage for charging the battery 311 and detects the remaining capacity information about the battery 311.

In this state, the switching unit 212 remains off. Furthermore, the power receiving antenna 301 and the matching circuit 302 are used to receive the power from the power supply apparatus 100. The circuits, units, or members included in the battery pack 300 used in receiving the power transmitted from the power supply apparatus 100, such as the power receiving antenna 301 and the matching circuit 302, will be hereafter collectively referred to as a "second receiving unit(s)" or "second receiving means".

On the other hand, if the power receiving antenna 201 and the power receiving antenna 301 have both been selected by the selection process in step S406, in supplying power from the power supply apparatus 100 to the battery pack 300, the power receiving antenna 201 and the power receiving antenna 301 receive the power from the power supply apparatus 100. The CPU 205 executes control for supplying the power received by the power receiving antenna 201 to the battery 311. The CPU 305 executes control for supplying power received by the power receiving antenna 301 to the battery 311.

In addition, the CPU 305 controls the charging control unit 309 to start charging with the power supplied from the electronic device 200 to the battery 311 and with the power received by the battery pack 300 without being transmitted through the electronic device 200. In this case, the first receiving unit and the second receiving unit are used to receive the power from the power supply apparatus 100. After the charging of the battery 311 is started in step S408, the process advances from step S408 to step S409.

In the present exemplary embodiment, in step S408, either one of the charging control unit 209 and the charging control unit 309 charges the battery 311 by a constant voltage/constant current (CV/CC) method.

In step S409, similar to the process in step S402, the CPU 205 determines whether the battery 311 has been fully charged. If it is determined that the battery 311 has been fully charged (YES in step S409), then the CPU 205 executes control for ending the charging of the battery 311. More specifically, if the charging control unit 209 has been controlling the charging of the battery 311, the CPU 205 controls the charging control unit 209 to end the charging of the battery 311. On the other hand, if the charging control unit 309 has been controlling the charging of the battery 311, the CPU 205 inputs an instruction for ending the charging of the battery 311 to the battery pack 300. When the instruction is received, the CPU 305 controls the charging control unit 309 to end the charging of the battery 311. In this case (YES in step S409), the process ends. On the other hand, if it is determined that the battery 311 has not been fully charged (NO in step S409), then the process returns from step S409 to step S408.

In step S410 (performed when it is determined in S404 that the battery pack does not have a power receiving antenna), the CPU 205 executes control for turning on the switching unit 212 and inputs an instruction to the battery pack 300 for turning off the switching unit 312 via the battery interface 210. Then, the process advances from step S410 to step S407. After the process in step S410 is completed, in step S407, the CPU 205 controls the matching circuit 202 and the modulation and demodulation circuit 204 to transmit the power receiving information about the electronic device 200, which has been read from the ROM 206, to the power supply apparatus 100 via the power receiving antenna 201.

If the battery pack 300 is removed from the electronic device 200 during the charging process illustrated in FIG. 4, the CPU 205 can end the charging process illustrated in FIG. 4 after executing control for turning off the switching unit 212 and turning on the switching unit 312. Accordingly, even if the battery pack 300 has been removed from the electronic device 200, if the distance between the battery pack 300 and the power supply apparatus 100 is within a range with which power can be transmitted from the power supply apparatus 100 to the battery pack 300, the battery pack 300 receives the power from the power supply apparatus 100 via the power receiving antenna 301.

By executing the above-described process, even if the battery pack 300 has been removed from the electronic device 200, the battery pack 300 can continue the charging of the battery 311 with the power received from the power supply apparatus 100 via the power receiving antenna 301 without a break. If it is detected by the CPU 305 that the battery pack 300 has been removed from the electronic device 200, the CPU 305 can charge the battery 311 with the power received by the power receiving antenna 301 after executing control for turning on the switching unit 312.

In step S404, the CPU 205 determines whether the battery pack 300 includes the power receiving antenna 301. However, alternatively, the CPU 205 can determine whether the battery pack 300 includes the second receiving unit. Alternatively, in step S408, the CPU 205 can execute control for starting the charging of the battery 311 after receiving a command for instructing the start of the charging from the power supply apparatus 100. Moreover, alternatively, the CPU 205 can execute control for ending the charging of the battery 311 if a command for ending the charging is received from the power supply apparatus 100 even if it is determined in step S409 that the battery 311 has not been fully charged.

Now, the selection process according to the present exemplary embodiment, which is executed by the electronic device 200 in step S406 included in the charging process, will be described in detail below with reference to the flow chart of FIG. 5. The selection process may be realized by the CPU 205 executing the computer program from the ROM 206.

Referring to FIG. 5, in step S501, the CPU 205 determines whether the electronic device 200 is in a predetermined mode. The predetermined mode is a mode for detecting the power receiving information about the electronic device 200 and the power receiving information about the battery pack 300.

The electronic device 200 can be previously set by the user to the predetermined mode. Alternatively, the electronic device 200 can be controlled to shift to the predetermined mode according to an instruction from the power supply apparatus 100. Furthermore, the CPU 205 can control the electronic device 200 to shift to the predetermined mode according to the orientation of the electronic device 200 or according to how the electronic device 200 is placed on the power supply apparatus 100.

If it is determined that the electronic device 200 is not in the predetermined mode (NO in step S501), then the process advances from step S501 to step S507. On the other hand, if it is determined that the electronic device 200 is in the predetermined mode (YES in step S501), then the process advances from step S501 to step S502.

In step S502, the CPU 205 executes a detection process for detecting the power receiving information about the electronic device 200 and the power receiving information about the battery pack 300. By executing the detection process, the CPU 205 can detect the power receiving information about the electronic device 200 and the power receiving information about the battery pack 300.

After the detection process by the CPU 205 in step S502 is completed, the process advances from step S502 to step S503. The detection process will be described in detail below.

In step S503, the CPU 205 determines whether the sum of the maximum threshold value of the current to be supplied to the battery 311, which is included in the power receiving information about the electronic device 200, and the maximum threshold value of the current to be supplied by the battery pack 300 to the battery 311 for charging the battery 311, which is included in the power receiving information about the battery pack 300, is equal to or greater than a predetermined value. The sum of the maximum threshold value of the current to be supplied to the battery 311, which is included in the power receiving information about the electronic device 200, and the maximum threshold value of the current to be supplied by the battery pack 300 to the battery 311 for charging the battery 311, which is included in the power receiving information about the battery pack 300, will hereafter be simply referred to as a "first value". The CPU 205 calculates the first value according to the power receiving information about the electronic device 200 and the power receiving information about the battery pack 300.

In step S503, the CPU 205 sets the predetermined value used in the determination in step S503 in the permissible current value, which is recorded on the RAM 207 and included in the charging information about the battery 311.

If the detection process in step S502 has been executed, the CPU 205 calculates the first value by using the power receiving information about the electronic device 200 and the power receiving information about the battery pack 300, which are detected by the detection process in step S502. If the detection process in step S502 has not been executed (NO in step S501), then in step S507, the CPU 205 calculates the first value by using the power receiving information about the electronic device 200, which has been previously recorded on the ROM 206, and the power receiving information about the battery pack 300, which is acquired from the battery pack 300.

If the first value is equal to or less than the predetermined value (YES in step S503), then the process advances from step S503 to step S508. On the other hand, if it is determined that the first value is greater than the predetermined value (NO in step S503), then the process advances from step S503 to step S504. In the present exemplary embodiment, the determination in step S503 is defined as a "second determination".

In step S504, the CPU 205 determines whether the power received by the electronic device 200 is higher than the power received by the battery pack 300. More specifically, the CPU 205 determines whether the power received by the electronic device 200 is higher than the power received by the battery pack 300 according to the power receiving information about the electronic device 200 and the power receiving information about the battery pack 300.

If it is determined by the CPU 205 that the maximum power that the power receiving antenna 201 can receive is greater than the maximum power that the power receiving antenna 301 can receive, the power received by the electronic device 200 is larger than the power received by the battery pack 300. In this case (YES in step S504), then the process advances from step S504 to step S509.

If it is determined by the CPU 205 that the maximum power that the power receiving antenna 201 can receive is not greater than the maximum power that the power receiving antenna 301 can receive (NO in step S504), the power received by the electronic device 200 is equal to or less than the power received by the battery pack 300. Then, the process advances from step S504 to step S505.

If the detection process in step S502 has been executed, the CPU 205 executes the determination in step S504 by using the power receiving information about the electronic device 200 and the power receiving information about the battery pack 300, which are detected by the detection process in step S502. On the other hand, if it is determined that if the detection process in step S502 has not been executed (NO in step S501), then the CPU 205 executes the determination in step S504 according to the power receiving information about the electronic device 200, which has been previously recorded on the ROM 206, and the power receiving information about the battery pack 300, which is acquired from the battery pack 300.

In step S505, the CPU 205 executes control for turning off the switching unit 212 and inputs to the battery pack 300 an instruction for turning on the switching unit 312. In the present exemplary embodiment, the instruction for turning on the switching unit 312 will be hereafter simply referred to as a "third instruction".

If the third instruction is received by the battery pack 300, the CPU 305 executes control for turning on the switching unit 312. In this case, the process advances from step S505 to step S506.

In step S506, the CPU 205 inputs to the battery pack 300 an instruction for executing the charging of the battery 311 and controls the operation of the charging control unit 209 to stop. The instruction input to the battery pack 300 for executing the charging of the battery 311 will be hereafter simply referred to as a "charge control instruction".

When the charge control instruction is received by the battery pack 300, the CPU 305 controls the charging control unit 309 to detect the remaining capacity information about the battery 311. In addition, the CPU 305 controls the charging control unit 309 to detect the current to be supplied to the battery 311 and the voltage to be supplied to the battery 311. In addition, the CPU 305 executes control for transmitting the information detected by the charging control unit 309 to the CPU 205 via the battery interface 310. Then, the process ends.

In step S507, the CPU 205 reads the power receiving information about the electronic device 200, which is recorded on the ROM 206, and the power receiving information about the battery pack 300, which is recorded on the RAM 207 and which has been acquired from the battery pack 300. Then, the process advances from step S507 to step S503.

In step S508, the CPU 205 executes control for turning on the switching unit 212 and inputs the third instruction to the battery pack 300. If the third instruction is received by the battery pack 300, the CPU 305 executes control for turning on the switching unit 312. Then, the process advances from step S508 to step S506.

In step S509, the CPU 205 executes control for turning on the switching unit 212 and inputs to the battery pack 300 an instruction for turning off the switching unit 312. The instruction for turning off the switching unit 312 will be hereafter simply referred to as a "fourth instruction". If the fourth instruction is received by the battery pack 300, the CPU 305 executes control for turning off the switching unit 312. Then, the process ends.

In step S503, the CPU 205 determines whether the first value is equal to or less than the predetermined value. However, the present exemplary embodiment is not limited to the above-described method. More specifically, the sum of the maximum threshold value of the voltage to be supplied to the battery 311, which is included in the power receiving information about the electronic device 200, and the maximum threshold value of the voltage to be supplied to the battery 311, which is included in the power receiving information about the battery pack 300, can be used as the first value. In this case, the CPU 205 sets the predetermined value in the permissible voltage value, which is included in the power receiving information about the battery pack 300.

After determining whether the first value is equal to or less than the predetermined value, the electronic device 200 can charge the battery 311 while preventing an overvoltage from being applied to the battery 311.

In addition, for example, the CPU 205 can set the maximum threshold value of the power to be supplied to the battery 311, which is calculated based on the power receiving information about the electronic device 200, and the maximum threshold value of the power to be supplied to the battery 311, which is calculated based on the power receiving information about the battery pack 300, as the first value. In this case, the CPU 205 sets the predetermined value in a product of the permissible voltage value included in the charging information about the battery 311 by the permissible current value included in the charging information about the battery 311.

After determining whether the first value is equal to or less than the predetermined value in the above-described manner, the electronic device 200 can charge the battery 311 by preventing an overcurrent from being applied to the battery 311.

In step S504, the CPU 205 determines whether the power received by the electronic device 200 is higher than the power received by the battery pack 300. However, the present exemplary embodiment is not limited to the above-described method. More specifically, alternatively, the CPU 205 can determine whether the power received by the electronic device 200 is higher than the power received by the battery pack 300 according to a result of comparison between the area of the power receiving antenna 201 and the area of the power receiving antenna 301.

In this case, if the area of the power receiving antenna 201 is greater than the area of the power receiving antenna 301, the CPU 205 determines that the power received by the electronic device 200 is higher than the power received by the battery pack 300 (YES in step S504). On the other hand, if it is determined that the area of the power receiving antenna 201 is not greater than the area of the power receiving antenna 301, the CPU 205 determines that the power received by the electronic device 200 is equal to or lower than the power received by the battery pack 300 (NO in step S504).

In this case, the CPU 205 uses the information about the area of the power receiving antenna 201, which is previously recorded on the ROM 206, and information about the area of the power receiving antenna 301, which is previously recorded on the ROM 306.

Alternatively, the CPU 205 can determine whether the power received by the electronic device 200 is higher than the power received by the battery pack 300 according to a result of comparison between the efficiency information included in the power receiving information about the electronic device 200 and the efficiency information included in the power receiving information about the battery pack 300.

If the efficiency of the power received by the power receiving antenna 201 is higher than the efficiency of the power received by the power receiving antenna 301, the CPU 205 determines that the power received by the electronic device 200 is higher than the power received by the battery pack 300 (YES in step S504). On the other hand, if it is determined that the efficiency of the power received by the power receiving antenna 201 is not higher than the efficiency of the power received by the power receiving antenna 301, the CPU 205 determines that the power received by the electronic device 200 is equal to or less than the power received by the battery pack 300 (NO in step S504).

In this case, the CPU 205 can compare the efficiency information included in the power receiving information about the electronic device 200 and the efficiency information included in the power receiving information about the battery pack 300 by using the power receiving information about the electronic device 200 and the power receiving information about the battery pack 300, which are detected by the detection process in step S502. Alternatively, the CPU 205 can use the efficiency information included in the power receiving information about the electronic device 200, which is previously recorded on the ROM 206, and the efficiency information included in the power receiving information about the battery pack 300, which is previously recorded on the ROM 306.

Now, the detection process according to the present exemplary embodiment, which is executed by the electronic device 200 in step S502 during the selection process, will be described in detail below with reference to the flow chart of FIG. 6. The detection process may be realized by the CPU 205 executing the computer program from the ROM 206. In the present exemplary embodiment, it is supposed that before executing the detection process, the predetermined power for executing a communication between the power supply apparatus 100 and the electronic device 200 has already been supplied from the power supply apparatus 100 to the electronic device 200.

Referring to FIG. 6, in step S601, the CPU 205 controls the matching circuit 202 and the modulation and demodulation circuit 204 to transmit a first command to the power supply apparatus 100 via the power receiving antenna 201. The "first command" refers to a command for requesting the power supply apparatus 100 to transmit the power required for detecting the power receiving information about the electronic device 200 and the power receiving information about the battery pack 300. After the first command is transmitted to the power supply apparatus 100 in step S601, the process advances from step S601 to step S602.

After the power supply apparatus 100 receives the first command, the power supply apparatus 100 transmits power and power information to the electronic device 200 and the battery pack 300. The power information includes a value of the power to be transmitted to the electronic device 200 and the battery pack 300.

The electronic device 200 receives the power from the power supply apparatus 100 via the power receiving antenna 201. The power received by the power receiving antenna 201 is supplied to the charging control unit 209 via the matching circuit 202, the rectification and smoothing circuit 203, and the regulator 208.

In addition, the electronic device 200 receives the power information transmitted from the power supply apparatus 100 via the power receiving antenna 201. The power information received by the power receiving antenna 201 is transmitted to the CPU 205 via the matching circuit 202 and the modulation and demodulation circuit 204.

In step S602, the CPU 205 executes control for turning on the switching unit 212. Then, the process advances from step S602 to step S603. If the switching unit 212 has already been turned on, the process in step S602 can be omitted. If the switching unit 312 has been turned on, the CPU 205 inputs an instruction for turning off the switching unit 312 to the battery pack 300.

In step S603, the CPU 205 controls the charging control unit 209 to measure the power supplied from the power receiving antenna 201 to the charging control unit 209. The CPU 205 records the information about a value of the power measured by the charging control unit 209 on the RAM 207.

After the power is measured by the charging control unit 209 in step S603, the process advances from step S603 to step S604.

In step S604, the CPU 205 detects the power receiving information about the electronic device 200 according to the information about the value of the power measured in step S603. Furthermore, the CPU 205 detects a maximum threshold value of the current supplied to the battery 311 and a maximum threshold value of the voltage supplied to the battery 311 according to the value of the power measured in step S603.

In addition, after CPU 205 receives the power information from the power supply apparatus 100, the CPU 205 detects the efficiency information about the power receiving antenna 201 according to the power information and the value of the power measured in step S603. The CPU 205 records the efficiency information about the power receiving antenna 201 on the RAM 207 as the power receiving information about the electronic device 200.

If the power receiving information about the electronic device 200 is detected in step S604, the process advances from step S604 to step S605. On the other hand, if the electronic device 200 has not received any power information from the power supply apparatus 100, the CPU 205 can control the matching circuit 202 and the modulation and demodulation circuit 204 to transmit, to the power supply apparatus 100, a command for requesting the power supply apparatus 100 to transmit the power information.

In step S605, the CPU 205 executes control for turning off the switching unit 212 and inputs the third instruction to the battery pack 300. If the third instruction is received by the battery pack 300, the CPU 305 executes control for turning on the switching unit 312. Then, the process advances from step S605 to step S606.

In step S606, the CPU 205 inputs an instruction to the battery pack 300 for controlling the charging control unit 309 to measure the power supplied from the power receiving antenna 301 to the charging control unit 309 and to transmit the information about the value of the power measured by the charging control unit 309 to the CPU 205.

The instruction for controlling the charging control unit 309 to measure the power supplied from the power receiving antenna 301 to the charging control unit 309 and to transmit the information about the value of the power measured by the charging control unit 309 to the CPU 205 will be hereafter simply referred to as a "fifth instruction".

If the fifth instruction is received by the battery pack 300, the CPU 305 controls the charging control unit 209 to measure the power supplied from the power receiving antenna 301 to the charging control unit 309. In addition, the CPU 305 executes control for recording the information about the value of the power measured by the charging control unit 309 on the RAM 307 and for transmitting the information to the CPU 205.

If the information about the value of the power measured by the charging control unit 209 is transmitted to the CPU 205, the CPU 205 records the received information on the RAM 207 in step S606. Then, the process advances from step S606 to step S607.

In step S607, the CPU 205 detects the power receiving information about the battery pack 300 according to the information about the value of the power measured by the charging control unit 209 in step S606. The CPU 205 detects a maximum threshold value of the current supplied to the battery 311 and a maximum threshold value of the voltage supplied to the battery 311 according to the value of the power measured by the charging control unit 209 in step S606.

In addition, if the power information has been received from the power supply apparatus 100, the CPU 205 detects efficiency information about the power receiving antenna 301 according to the power information and the value of the power measured in step S606. The CPU 205 records the efficiency information about the power receiving antenna 301 on the RAM 207 as the power receiving information about the battery pack 300.

If the power receiving information about the battery pack 300 is detected in step S607, the process advances from step S607 to step S608. In step S608, the CPU 205 executes control for turning off the switching unit 212 and inputs fourth instruction to the battery pack 300.

If the fourth instruction is received by the battery pack 300, then the CPU 305 executes control for turning off the switching unit 312. Then, the process advances from step S608 to step S609.

In step S609, the CPU 205 controls the matching circuit 202 and the modulation and demodulation circuit 204 to transmit a second command to the power supply apparatus 100 via the power receiving antenna 201. The "second command" is a command for notifying that the power receiving information about the electronic device 200 and the power receiving information about the battery pack 300 have been normally detected (i.e., that the process for detecting the same has ended). After the second command has been transmitted to the power supply apparatus 100 in step S609, then the process advances to step S503 in the selection process.

Now, a power supply process according to the present exemplary embodiment, which is executed by the power supply apparatus 100, will be described in detail below with reference to the flow chart of FIG. 7. The power supply process may be realized by the CPU 105 executing the computer program from the ROM 106.

The power supply process illustrated in FIG. 7 is executed by the power supply apparatus 100 when the power supply apparatus 100 is in a power supply mode. In executing the power supply process under control of the CPU 105, it is supposed that the predetermined power for the communication is always and continuously supplied from the power supply apparatus 100 to the electronic device 200 and the battery pack 300.

Referring to FIG. 7, in step S701, the CPU 105 detects whether the electronic device 200 exists in the range in which the electronic device 200 can receive power from the power supply apparatus 100 according to a change of the current supplied to the power supply antenna 108, which is detected by the matching circuit 103.

If it is determined that the electronic device 200 does not exist in the range in which the electronic device 200 can receive power from the power supply apparatus 100 (NO in step S701), then the CPU 105 repeats the process in step S701. On the other hand, if it is determined that the electronic device 200 exists in the range in which the electronic device 200 can receive power from the power supply apparatus 100 (YES in step S701), then the process advances from step S701 to step S702.

In step S702, the CPU 105 determines whether the modulation and demodulation circuit 104 has received the identification information about the electronic device 200 from the electronic device 200. If it is determined that the modulation and demodulation circuit 104 has received the identification information about the electronic device 200 (YES in step S702), then the CPU 105 acquires the identification information about the electronic device 200 from the electronic device 200 and records the acquired the identification information about the electronic device 200 on the RAM 107.

If the identification information about the electronic device 200 and the identification information about the battery pack 300 have been received from the electronic device 200, the CPU 105 records information about the electronic device 200 and the identification information about the battery pack 300 separately from each other on the RAM 107. In this case (YES in step S702), then the process advances from step S702 to step S703.

On the other hand, if it is determined that the modulation and demodulation circuit 104 has not received the power receiving information about the electronic device 200 yet (NO in step S702), then the process ends.

In step S703, the CPU 105 determines whether the modulation and demodulation circuit 104 has received the first command from the electronic device 200. If it is determined that the modulation and demodulation circuit 104 has not received the first command, which has been transmitted from the electronic device 200 (NO in step S703), then the process advances from step S703 to step S706. On the other hand, if it is determined that the modulation and demodulation circuit 104 has received the first command, which has been transmitted from the electronic device 200 (YES in step S703), then the process advances from step S703 to step S704.

In step S704, the CPU 105 outputs first power and the power information, which are used in detecting the power receiving information about the electronic device 200 and the power receiving information about the battery pack 300, to the electronic device 200 and the battery pack 300 via the power supply antenna 108 according to the first command. The power information in step S704 is information that includes a value of the first power.

In this case, the CPU 105 controls the power transmission circuit 102 and the matching circuit 103 to transmit the first power to the electronic device 200 and the battery pack 300 via the power supply antenna 108. Then, the process advances from step S704 to step S705. The first power is higher than the power used for the communication with the electronic device 200 and the battery pack 300 executed by using the command.

In step S705, the CPU 105 determines whether the modulation and demodulation circuit 104 has received the second command from the electronic device 200. If it is determined that the modulation and demodulation circuit 104 has not received the second command from the electronic device 200 yet (NO in step S705), then the process returns from step S705 to step S704. In this case, the CPU 105 continuously transmits the first power to the electronic device 200 and the battery pack 300.

On the other hand, if it is determined that the modulation and demodulation circuit 104 has received the second command from the electronic device 200 (YES in step S705), then the process advances from step S705 to step S706. In this case, the CPU 105 controls the power transmission circuit 102 and the matching circuit 103 to stop outputting the first power.

If the output of the first power has been stopped, the CPU 105 executes control for outputting the predetermined power used for the communication to the electronic device 200 and the battery pack 300.

In step S706, the CPU 105 determines whether the modulation and demodulation circuit 104 has received at least one of the power receiving information about the electronic device 200 and the power receiving information about the battery pack 300. If it is determined that the modulation and demodulation circuit 104 has received at least one of the power receiving information about the electronic device 200 and the power receiving information about the battery pack 300 (NO in step S706), then the process ends.

On the other hand, if it is determined that the modulation and demodulation circuit 104 has received at least one of the power receiving information about the electronic device 200 and the power receiving information about the battery pack 300 (YES in step S706), then the CPU 105 acquires the power receiving information received by the modulation and demodulation circuit 104. In addition, the CPU 105 records the acquired power receiving information on the RAM 107. In this case (YES in step S706), then the process advances from step S706 to step S707.

If the modulation and demodulation circuit 104 has received the power receiving information about the electronic device 200 and the power receiving information about the battery pack 300, the CPU 105 records the power receiving information about the electronic device 200 and the power receiving information about the battery pack 300 on the RAM 107 separately from each other.

Before the CPU 105 executes the determination in step S706, the CPU 105 can transmit a command to the electronic device 200 for requesting the electronic device 200 to transmit the power receiving information about the electronic device 200. In addition, before the CPU 105 executes the determination in step S706, the CPU 105 can transmit a command from the power supply apparatus 100 to the battery pack 300 for requesting the battery pack 300 to transmit the power receiving information about the battery pack 300 to the power supply apparatus 100.

In step S707, the CPU 105 controls the power transmission circuit 102 and the matching circuit 103 to output second power to the electronic device 200 and the battery pack 300 according to at least one of the power receiving information about the electronic device 200 and the power receiving information about the battery pack 300, which have been received in step S706.

The second power is power for charging the battery 311. In addition, the second power is higher than the predetermined power for the communication with the electronic device 200 and the battery pack 300. Furthermore, the second power is higher than the first power.

On the other hand, if the power receiving information about the electronic device 200 has been received in step S706, the CPU 105 controls the power transmission circuit 102 and the matching circuit 103 to control the second power to a level equal to or lower than the maximum power that the power receiving antenna 201 can receive. Furthermore, if the power receiving information about the battery pack 300 has been received in step S706, the CPU 105 controls the power transmission circuit 102 and the matching circuit 103 to control the level of the second power to a level equal to or lower than the maximum power that the power receiving antenna 301 can receive.

Moreover, if the power receiving information about the electronic device 200 and the power receiving information about the battery pack 300 have been received in step S706, the CPU 105 controls the second power according to the power receiving information about the electronic device 200 and the power receiving information about the battery pack 300.

In this case, in step S707, the CPU 105 controls the power transmission circuit 102 and the matching circuit 103 to control the second power to a level equal to or less than the maximum power that the power receiving antenna 201 and the power receiving antenna 301 can receive. Then, the process advances from step S707 to step S708.

In step S708, the CPU 105 determines whether to end the power supply process according to a result of a determination as to whether an operation for ending the power supply process has been input to the power supply apparatus 100. If it is determined that an operation for ending the power supply process has been input to the power supply apparatus 100 (YES in step S708), the CPU 105 determines that the power supply process is ended.

In this case, the CPU 105 controls the power transmission circuit 102 and the matching circuit 103 so that the level of the power supplied to the electronic device 200 and the battery pack 300 is equal to the level of the predetermined power that the power supply apparatus 100 can communicate with the electronic device 200 and the battery pack 300. In this case (YES in step S708), the process ends.

On the other hand, if it is determined that no operation for ending the power supply process has been input to the power supply apparatus 100 (NO in step S708), then the CPU 105 determines that the power supply process is not ended. Then, the process returns from step S708 to step S707. In this case, the CPU 105 continuously transmits the second power to the electronic device 200 and the battery pack 300.

In step S701, the CPU 105 detects that the electronic device 200 exists in the range in which the electronic device 200 can receive power from the power supply apparatus 100 if a change of the current supplied to the power supply antenna 108 is detected. However, alternatively, the detection can be executed according to a change of the voltage supplied to the power supply antenna 108, if any. Further alternatively, the CPU 105 can detect that the electronic device 200 exists in the range in which the electronic device 200 can receive power from the power supply apparatus 100 according to a change of a standing wave ratio (SWR).

Alternatively, the CPU 105 can determine whether the electronic device 200 exists in the range in which the electronic device 200 can receive power from the power supply apparatus 100 according to a response to a command for verifying whether the electronic device 200 exists, which can be periodically input.

If it is determined by the CPU 105 that the first command has been received from the electronic device 200 (YES in step S703), then in step S704, the CPU 105 outputs the first power to the electronic device 200 and the battery pack 300. However, if it is determined by the CPU 105 that the first command has been received from the electronic device 200 (YES in step S703), then the CPU 105 can determine whether the battery 311 has been fully charged in addition to executing the determination in step S703.

In this case, if the first command has been received from the electronic device 200 but the battery 311 has not been fully charged, then the CPU 105 can supply the first power to the electronic device 200 and the battery pack 300. On the other hand, if the first command has been received from the electronic device 200 and the battery 311 has been fully charged, then the CPU 105 does not execute control for supplying the first power to the electronic device 200 and the battery pack 300 in step S704. In this case, the power supply process illustrated in FIG. 7 ends there. In addition, in this case, the CPU 105 does not execute control for outputting the first power and the second power to the electronic device 200 and the battery pack 300.

In transmitting the second power from the power supply apparatus 100 to the electronic device 200 and the battery pack 300 in step S707, the electronic device 200 and the battery pack 300 can be supplied with the power from the power supply apparatus 100 in parallel to each other. Alternatively, in supplying the second power from the power supply apparatus 100 to the electronic device 200 and the battery pack 300, the electronic device 200 and the battery pack 300 can be supplied with the power from the power supply apparatus 100 by time division supplying.

Further alternatively, in supplying the second power from the power supply apparatus 100 to the electronic device 200 and the battery pack 300, one of the electronic device 200 and the battery pack 300 can be supplied with the power from the power supply apparatus 100 according to a result of the process executed by the CPU 205 in step S406 (FIG. 4).

For example, if it is detected by the power supply apparatus 100 that the power receiving antenna 201 has been selected by the selection process in step S406, the power supply apparatus 100 does not execute control for supplying power to the battery pack 300 but for supplying power to the electronic device 200. Specifically if the power receiving antenna 201 has been selected by the power supply apparatus 100 in the selection process in step S406, the power transmitted in step S707 is not received by the battery pack 300. More specifically this is because the CPU 205 executed control for turning on the switching unit 212 and inputting an instruction to the battery pack 300 to turn off the switching unit 312 in step S509. On the other hand, if it is detected by the power supply apparatus 100 that the power receiving antenna 301 has been selected by the selection process in step S406, the power supply apparatus 100 does not execute control for supplying power to the electronic device 200 but for supplying power to the battery pack 300. Specifically if the power receiving antenna 301 has been selected by the power supply apparatus 100 in the selection process in step S406, the power transmitted in step S707 is not received by the electronic device 200. More specifically this is because the CPU 205 executed control for turning off the switching unit 212 and inputting an instruction to the battery pack 300 to turn on the switching unit 312 in step S505.

Furthermore, if it is detected by the power supply apparatus 100 that the power receiving antenna 201 and the power receiving antenna 301 have been selected by the selection process in step S406, the power supply apparatus 100 can supply the electronic device 200 and the battery pack 300. Specifically if both the power receiving antenna 201 and the power receiving antenna 301 have been selected by the selection process in step S406, the power transmitted in S707 is received by both. More specifically this is because the CPU executed control for turning on the switching unit and inputting an instruction to the battery pack 300 to turn on the switch 312 in step S508.

In step S708, the CPU 105 determines whether the CPU 105 ends the power supply process according to whether an operation for stopping the power supply has been input to the power supply apparatus 100. However, the present exemplary embodiment is not limited to this. For example, alternatively, the CPU 105 can determine whether the CPU 105 ends the power supply process according to whether the modulation and demodulation circuit 104 has received from the electronic device 200 or the battery pack 300 a command for stopping the supply of power. Further alternatively, the CPU 105 can determine whether the CPU 105 ends the power supply process according to whether the modulation and demodulation circuit 104 has received a command for notifying that the battery 311 has been fully charged.

With the above-described configuration, the charging system according to the present exemplary embodiment can execute the charging of the battery 311 and prevent an overcurrent to be supplied to the battery 311 even if the battery pack 300 having the power receiving antenna 301 is mounted on the electronic device 200. Accordingly, if the value of the current supplied to the battery 311 according to the power received by using the power receiving antenna 201 and the power receiving antenna 301 is equal to or less than the predetermined permissible value, the battery 311 is charged with the power received by using the power receiving antenna 201 and the power receiving antenna 301.

With the above-described configuration, the charging system according to the present exemplary embodiment can charge the battery 311 efficiently and prevent an overcurrent to be supplied to the battery 311. In addition, the present exemplary embodiment having the above-described configuration the battery 311 is efficiently charged by using the power receiving antenna 201 and the power receiving antenna 301.

Furthermore, if the value of the current supplied to the battery 311 based on the power received by using the power receiving antenna 201 and the power receiving antenna 301 is larger than the predetermined value, the battery 311 is charged by using the antenna whose power receiving capacity is the higher of the power receiving antenna 201 and the power receiving antenna 301. With the above-described configuration, in the charging system according to the present exemplary embodiment, the battery 311 can be charged efficiently by using the power receiving antenna having a high power receiving capacity and be not supplied with an overcurrent.

Furthermore, if the first value is set in the sum of the maximum threshold value of the voltage supplied to the battery 311, which is included in the power receiving information about the electronic device 200, and the maximum threshold value of the voltage supplied to the battery 311, which is included in the power receiving information about the battery pack 300, the electronic device 200 can charge the battery 311 and prevent an overvoltage to be supplied to the battery 311.

To implement the above-described effect, if the value of the voltage supplied to the battery 311 according to the power received by using the power receiving antenna 201 and the power receiving antenna 301 is equal to or less than the predetermined permissible value, the battery 311 is charged with the power received by the power receiving antenna 201 and the power receiving antenna 301.

Accordingly, in the charging system according to the present exemplary embodiment, the battery 311 can be charged efficiently and be prevent an overvoltage to be supplied to the battery 311. In addition, the battery 311 can be efficiently charged by using the power receiving antenna 201 and the power receiving antenna 301.

Furthermore, if the value of the voltage supplied to the battery 311 based on the power received by using the power receiving antenna 201 and the power receiving antenna 301 is larger than the predetermined value, the battery 311 is charged by using the antenna whose power receiving capacity is higher of the power receiving antenna 201 and the power receiving antenna 301. Accordingly, in the charging system according to the present exemplary embodiment, the battery 311 can be charged efficiently by using the power receiving antenna having a high power receiving capacity and be not supplied with an overvoltage.

In addition, if the first value is set to the sum of the maximum threshold value of the power supplied to the battery 311, which is included in the power receiving information about the electronic device 200, and the maximum threshold value of the power supplied to the battery 311, which is included in the power receiving information about the battery pack 300, the electronic device 200 can charge the battery 311 and prevent an over power being supplied to the battery 311.

To implement the above-described effect, if the value of the power supplied to the battery 311 according to the power received by using the power receiving antenna 201 and the power receiving antenna 301 is equal to or less than the predetermined permissible value, the battery 311 is charged with the power received by the power receiving antenna 201 and the power receiving antenna 301. Accordingly, in the charging system according to the present exemplary embodiment, the battery 311 can be charged efficiently and be prevent an over power to be supplied to the battery 311. In addition, the battery 311 can be efficiently charged by using the power receiving antenna 201 and the power receiving antenna 301.

Furthermore, if the value of the power supplied to the battery 311 based on the power received by using the power receiving antenna 201 and the power receiving antenna 301 is larger than the predetermined value, the battery 311 is charged efficiently by using the antenna having a high power receiving capacity and be not supplied with an over power.

Furthermore, alternatively, the communication between the power supply apparatus 100 and the electronic device 200 can be executed by a communication method other than the ASK modulation. For example, the communication between the power supply apparatus 100 and the electronic device 200 can be realized by a wireless local area network (LAN). In this case, the power supply apparatus 100 has a communication means or unit (not illustrated) which communicates with the electronic device 200 by the wireless LAN. In addition, the electronic device 200 has a communication means or unit (not illustrated) which communicates with the power supply apparatus 100 by the wireless LAN.

In this case, even if the switching unit 212 has been turned off, the electronic device 200 can receive a command transmitted from the power supply apparatus 100 by using the communication unit (not illustrated) of the electronic device 200 corresponding to the wireless LAN. In addition, the electronic device 200 can transmit the command to the power supply apparatus 100 via the communication unit (not illustrated) of the electronic device 200 corresponding to the wireless LAN.

Similarly, the communication between the power supply apparatus 100 and the battery pack 300 can be realized by a communication method other than the ASK modulation. For example, the communication between the power supply apparatus 100 and the battery pack 300 can be realized by the wireless LAN. In this case, the power supply apparatus 100 has a communication unit (not illustrated) which communicates with the battery pack 300 by the wireless LAN. In addition, the battery pack 300 has a communication unit (not illustrated) which communicates with the power supply apparatus 100 by the wireless LAN.

In the present exemplary embodiment, the electronic device 200 executes the above-described process if the battery pack 300 is mounted on the electronic device 200. However, the process can be executed by the electronic device 200 even if two or more battery packs are mounted on the electronic device 200.

In the present invention, the power supply apparatus 100 is not limited to the power supply apparatus 100 according to the present exemplary embodiment. In addition, in the present invention, the electronic device 200 is not limited to the electronic device 200 according to the present exemplary embodiment. Furthermore, in the present invention, the battery pack 300 is not limited to the battery pack 300 according to the present exemplary embodiment. For example, the power supply apparatus 100, the electronic device 200, and the battery pack 300 of the present invention can be realized by a system including a plurality of apparatuses.

In addition, various processes, operations and functions described above in the present exemplary embodiment can also be realized by a computer program. In this case, the computer program of the present invention can be executed on a computer (including a CPU) and can implement various functions described above in the present exemplary embodiment. In particular the present invention relates to a computer program which on execution by a programmable electronic device causes the electronic device to implement various functions as described above.

The computer program of the present invention can implement various processing and functions described above in the present exemplary embodiment by utilizing an operating system (OS) operating on the computer. The computer program of the present invention is loaded from a computer-readable storage medium and is executed by the computer. The computer-readable storage medium includes a hard disk drive (HDD), an optical disk, a compact disc-read only memory (CD-ROM), a CD-recordable (CD-R), a memory card, and a ROM.

In addition, the computer program of the present invention can be provided to the computer from an external apparatus via a communication interface and can be executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-265095 filed Nov. 29, 2010, which is hereby incorporated by reference herein in its entirety.

What is claimed is:

1. An electronic device comprising:
    a first power receiving unit for wirelessly receiving power from a power supply apparatus;
    an interface unit that connects to a battery device, wherein the battery device includes a second power receiving unit for wirelessly receiving power from the power supply apparatus; and
    a control unit that
    selects the first power receiving unit or the second power receiving unit when power that can be received by the first power receiving unit and the second power receiving unit from the power supply apparatus is higher than a predetermined value,
    charges a battery included in the battery device by using the first power receiving unit without using the second power receiving unit if the first power receiving unit is selected, and
    charges the battery included in the battery device by using the second power receiving unit without using the first power receiving unit if the second power receiving unit is selected.

2. The electronic device according to claim 1, wherein the control unit selects the first power receiving unit, or the second power receiving unit, by using first information relating to the first power receiving unit and second information relating to the second power receiving unit, when power that can be received by the first power receiving unit and the second power receiving unit from the power supply apparatus is higher than the predetermined value.

3. The electronic device according to claim 1, wherein the control unit selects the first power receiving unit when power that can be received by the first power receiving unit and the second power receiving unit from the power supply apparatus is higher than the predetermined value and when power received by the first power receiving unit from the power supply apparatus is higher than power received by the second power receiving unit from the power supply apparatus.

4. The electronic device according to claim 1, wherein the control unit selects the second power receiving unit when power that can be received by the first power receiving unit and the second power receiving unit from the power supply apparatus is higher than the predetermined value and when power received by the first power receiving unit from the power supply apparatus is not higher than power received by the second power receiving unit from the power supply apparatus.

5. The electronic device according to claim 1, wherein the control unit selects the first power receiving unit
    when power that can be received by the first power receiving unit and the second power receiving unit from the power supply apparatus is higher than the predetermined value and
    when a power receiving efficiency of the first power receiving unit is higher than a power receiving efficiency of the second power receiving unit.

6. The electronic device according to claim 1, wherein the control unit selects the second power receiving unit
    when power that can be received by the first power receiving unit and the second power receiving unit from the power supply apparatus is higher than the predetermined value and
    when a power receiving efficiency of the first power receiving unit is not higher than a power receiving efficiency of the second power receiving unit.

7. The electronic device according to claim 1, wherein, if the battery device and the electronic device are not connected, the battery included in the battery device is charged by using the second power receiving unit without using the first power receiving unit.

8. The electronic device according to claim 1,
    wherein the first power receiving unit is configured to receive power from the power supply apparatus by magnetic field resonance, and
    wherein the second power receiving unit is configured to receive power from the power supply apparatus by magnetic field resonance.

9. A method comprising:
    selecting a first power receiving unit, for wirelessly receiving power from a power supply apparatus, or a second power receiving unit, for wirelessly receiving power from the power supply apparatus, when power that can be received by the first power receiving unit and the second power receiving unit from the power supply apparatus is higher than a predetermined value, wherein an electronic device includes the first power receiving unit and an interface unit that connects to a battery device, wherein the battery device includes the second power receiving unit;
    causing the electronic device to charge a battery included in the battery device by using the first power receiving unit without using the second power receiving unit if the first power receiving unit is selected; and
    causing the electronic device to charge the battery included in the battery device by using the second power receiving unit without using the first power receiving unit if the second power receiving unit is selected.

10. The method according to claim 9, wherein selecting includes selecting the first power receiving unit, or the second power receiving unit, by using first information relating to the first power receiving unit and second information relating to the second power receiving unit, when power that can be received by the first power receiving unit and the second power receiving unit from the power supply apparatus is higher than the predetermined value.

11. The method according to claim 9, wherein selecting includes selecting the first power receiving unit when power that can be received by the first power receiving unit and the second power receiving unit from the power supply apparatus is higher than the predetermined value and when power received by the first power receiving unit from the power supply apparatus is higher than power received by the second power receiving unit from the power supply apparatus.

12. The method according to claim 9, wherein selecting includes selecting the second power receiving unit when power that can be received by the first power receiving unit and the second power receiving unit from the power supply apparatus is higher than the predetermined value and when power received by the first power receiving unit from the power supply apparatus is not higher than power received by the second power receiving unit from the power supply apparatus.

13. The method according to claim 9, wherein selecting includes selecting the first power receiving unit
when power that can be received by the first power receiving unit and the second power receiving unit from the power supply apparatus is higher than the predetermined value and
when a power receiving efficiency of the first power receiving unit is higher than a power receiving efficiency of the second power receiving unit.

14. The method according to claim 9, wherein selecting includes selecting the second power receiving unit
when power that can be received by the first power receiving unit and the second power receiving unit from the power supply apparatus is higher than the predetermined value and
when a power receiving efficiency of the first power receiving unit is not higher than a power receiving efficiency of the second power receiving unit.

15. The method according to claim 9, wherein, if the battery device and the electronic device are not connected, causing the electronic device to charge the battery includes using the second power receiving unit without using the first power receiving unit.

16. The method according to claim 9,
wherein the first power receiving unit is configured to receive power from the power supply apparatus by magnetic field resonance, and
wherein the second power receiving unit is configured to receive power from the power supply apparatus by magnetic field resonance.

17. A non-transitory storage medium that stores a program to cause a computer to execute a method, the method comprising:
selecting a first power receiving unit, for wirelessly receiving power from a power supply apparatus, or a second power receiving unit, for wirelessly receiving power from the power supply apparatus, when power that can be received by the first power receiving unit and the second power receiving unit from the power supply apparatus is higher than a predetermined value, wherein an electronic device includes the first power receiving unit and an interface unit that connects to a battery device, wherein the battery device includes the second power receiving unit;
causing the electronic device to charge a battery included in the battery device by using the first power receiving unit without using the second power receiving unit if the first power receiving unit is selected; and
causing the electronic device to charge the battery included in the battery device by using the second power receiving unit without using the first power receiving unit if the second power receiving unit is selected.

18. The electronic device according to claim 1, further comprising a resonance circuit that causes the first power receiving unit to resonate with the power supply apparatus so that the first power receiving unit can wirelessly receive power from the power supply apparatus.

19. The method according to claim 9, further comprising using a resonance circuit to cause the first power receiving unit to resonate with the power supply apparatus so that the first power receiving unit can wirelessly receive power from the power supply apparatus.

* * * * *